(12) United States Patent
Reizei et al.

(10) Patent No.: US 7,371,165 B2
(45) Date of Patent: May 13, 2008

(54) CARD GAME PROGRAM AND CARD GAME MACHINE

(75) Inventors: Hirotaka Reizei, Tokyo (JP); Kazunobu Uchida, Tokyo (JP)

(73) Assignee: Konami Corporation, Minato-Ku, Tokyo (JP)

( * ) Notice: Subject to any disclaimer, the term of this patent is extended or adjusted under 35 U.S.C. 154(b) by 459 days.

(21) Appl. No.: 10/315,375

(22) Filed: Dec. 10, 2002

(65) Prior Publication Data

US 2003/0109299 A1    Jun. 12, 2003

(30) Foreign Application Priority Data

Dec. 11, 2001    (JP)    ............... 2001-376880

(51) Int. Cl.
| | |
|---|---|
| *A63F 13/00* | (2006.01) |
| *A63F 3/00* | (2006.01) |
| *A63F 3/02* | (2006.01) |
| *A63F 1/00* | (2006.01) |
| *A63F 9/20* | (2006.01) |

(52) U.S. Cl. .................. 463/11; 463/43; 273/244; 273/245; 273/246; 273/247; 273/259; 273/277; 273/292; 273/298; 273/308

(58) Field of Classification Search ........ 273/246–247, 273/277, 292, 298, 308, 244–245, 259; 463/11, 463/43
See application file for complete search history.

(56) References Cited

U.S. PATENT DOCUMENTS

| | | | | | |
|---|---|---|---|---|---|
| 3,048,404 | A | * | 8/1962 | Tebbs ......................... | 273/262 |
| 3,472,514 | A | * | 10/1969 | Green ........................ | 273/272 |
| 3,547,444 | A | * | 12/1970 | Williams et al. ............ | 273/294 |
| 3,829,098 | A | * | 8/1974 | Umminger, Jr. ............ | 273/249 |
| 4,378,118 | A | * | 3/1983 | Leonardi, Jr. ............... | 273/292 |
| 4,442,486 | A | * | 4/1984 | Mayer ........................ | 726/23 |

(Continued)

FOREIGN PATENT DOCUMENTS

JP    2000157744 A    *    6/2000

(Continued)

OTHER PUBLICATIONS

Risk II Game Manual, published in 2000 by Infogames Interactive, Inc., game released Feb. 29, 2000.*

(Continued)

*Primary Examiner*—John M. Hotaling, II
*Assistant Examiner*—William H McCulloch, Jr.
(74) *Attorney, Agent, or Firm*—Fish & Richardson P.C.

(57) ABSTRACT

A card game program has a routine for displaying areas of a player and an opponent, each being comprised of a plurality of hexes, a routine for displaying selective disposition of card on the hex, a routine for removing for displaying remove of a card between the hexes, a routine for dealing with battle for seizing damage between the cards of a player and the opponent and displaying the result, and a routine for computing point for computing victory point from a form of location of a card. A player can fight against the opponent, seizing damage between the player and the opponent by removing the card between the respective areas. Therefore, an element like strategic simulation game of attacking the respective areas can be added in addition to the interest as a card game.

8 Claims, 11 Drawing Sheets

U.S. PATENT DOCUMENTS

| | | | | |
|---|---|---|---|---|
| 4,454,594 | A * | 6/1984 | Heffron et al. | 726/26 |
| 4,560,170 | A * | 12/1985 | Enyi | 273/248 |
| 4,687,206 | A * | 8/1987 | Cordry et al. | 273/262 |
| 4,900,033 | A * | 2/1990 | Campos et al. | 273/249 |
| 5,607,159 | A * | 3/1997 | Bryson | 273/243 |
| 5,662,332 | A * | 9/1997 | Garfield | 273/308 |
| 5,927,717 | A * | 7/1999 | Berkovi et al. | 273/271 |
| 5,954,332 | A * | 9/1999 | Mero et al. | 273/236 |
| 6,254,099 | B1 * | 7/2001 | Pederson | 273/292 |
| 6,354,939 | B1 * | 3/2002 | Morita et al. | 463/1 |
| 6,375,566 | B1 * | 4/2002 | Yamada | 463/1 |
| 6,398,651 | B1 * | 6/2002 | Yamada | 463/43 |
| 6,419,584 | B1 * | 7/2002 | Sakamoto et al. | 463/43 |
| 6,435,508 | B1 * | 8/2002 | Tavel | 273/292 |
| RE37,957 | E * | 1/2003 | Garfield | 273/308 |
| 6,547,662 | B2 * | 4/2003 | Yamada | 463/11 |
| 6,561,513 | B1 * | 5/2003 | DeGeorge | 273/262 |
| 6,575,463 | B1 * | 6/2003 | Wintersteen | 273/261 |
| 6,601,851 | B1 * | 8/2003 | Sakamoto et al. | 273/308 |
| 6,656,039 | B2 * | 12/2003 | Yamada | 463/11 |
| 6,663,492 | B2 * | 12/2003 | Thompson et al. | 463/43 |
| 6,666,770 | B1 * | 12/2003 | Kubo et al. | 463/43 |
| 2001/0018366 | A1 * | 8/2001 | Shimomura et al. | 463/43 |
| 2003/0020239 | A1 * | 1/2003 | Hagen et al. | 273/296 |
| 2003/0227136 | A1 * | 12/2003 | Denkewicz, Jr. | 273/292 |

FOREIGN PATENT DOCUMENTS

| | | | |
|---|---|---|---|
| JP | 2000157747 A | * | 6/2000 |
| WO | WO 9604968 A1 | * | 2/1996 |

OTHER PUBLICATIONS

"Play Station Yu-Gi-Oh" published Dec. 14, 1999 by Shueisha Inc. (English translation of major parts on pp. 10, 13 and 14).

* cited by examiner

CARD GAME PROGRAM AND CARD GAME MACHINE

BACKGROUND OF THE INVENTION

This invention relates to card game program and card game machine in which victory or defeat is judged in such a way that predetermined sheets of cards displayed on a display are used, the form of displaying these cards is changed according to an operation of a player, point is computed according to a predetermined rule on the basis of the resultant various kinds of combinations of cards, the resultant forms of using card and the resultant forms of disposing card.

In most of such conventional card games, victory or defeat is determined in such a way that two players or a player and a computer playing the opponent's player respectively dispose a card on a place (on a display in this case) on the basis of the power or the attribute given to the card itself, and the card disposed on the place is judged according to a predetermined rule.

The basic rule of such a conventional card game is simple, that is, "both respectively dispose a card and victory or defeat is determined by superiority or inferiority of the card disposed". Therefore, various complex rules for determining victory or defeat have been conceived and various kinds of cards to be used have been designed in order to improve the interest.

But, such rule or such card is accepted by only a part of maniac since the rule of the game is too complex. So, the generality as a game program lacks and such rule is being made difficult type to approach.

Then, developments of a card game program and a card game machine, by which the interest can be improved in comparison with a conventional one without making the rule of the game complex, through which more people can enjoy the card game, are still awaited.

SUMMARY OF THE INVENTION

The present invention is a card game program for controlling a card game for playing by respectively disposing a card having fixed power on a place on a screen by both a player and an opponent, said card game program having the following routines:

a routine for displaying hex (for instance, a screen display program PDP) for respectively displaying areas for said player and said opponent on said screen, each of said areas being comprised of a plurality of hexes;

a routine for determining card to be used for game (such as a territory card, a unit card, a force card, an option card, for instance)(a card information evolution program CID, for instance) for determining a plurality of said cards to be used for said game concerning said player and for controlling so as to display said cards as a talon on said screen;

a routine for setting hand (a game turn control program GTP, for instance) for taking predetermined sheets of said cards (five sheets, for instance) from said talon and displaying said cards on a predetermined hand display area;

a routine for controlling turn (the game turn control program GTP, for instance) for controlling said turn, in which said card can be operated on said hex on said screen, between said player and said opponent;

a routine for disposing card (the game turn control program GTP, for instance) for displaying selective disposition of said card from said hand on said hex by an instruction by said player through an input means during said turn;

a routine for removing ("REMOVE" in this case include both "MOVEMENT" described hereinafter which means movement of a card in the same area and "TRANSFER" which means movement of a card between different areas) card (the game turn control program GTP, for instance) for displaying remove of said card disposed on said hex between said hexes by an instruction by said player through said input means during said turn;

a routine for dealing with battle (the game turn control program GTP, for instance) for executing a process for seizing damage between both cards of said player and said opponent when said both cards are disposed on said same hex and displaying the result on said screen;

a routine for computing victory point (the game turn control program GTP, for instance) for computing said victory point every said turn for said player or said opponent from a form of location of said card disposed on said hex;

a routine of victory declaration (the game turn control program GTP, for instance) for displaying victory declaration for said player on said screen concerning said game during execution at present on the basis of an instruction by said player through said input means; and a routine for judging victory (the game turn control program GTP, for instance) for judging as to whether or not predetermined victory condition is satisfied concerning said game in which said victory declaration is declared, and displaying the result.

According to this invention, a plurality of hexes can be respectively set and displayed on the areas of the player and the opponent by the routine for displaying hex, the player can remove a card between the areas of one's own and the opponent by the routine for removing card, and the player can fight against the opponent, seizing damage between both cards of the player and the opponent by the routine for dealing with battle. Therefore, an element like strategic simulation game of attacking the respective areas can be added to the card game in addition to the interest as a card game, and the interest of the game can be improved in comparison with a prior card game without making the rule of the game complex, thereby more people can enjoy the card game.

Besides, the present invention may be that said routine for determining card to be used for game has a routine for selecting card to be used for game for selecting card data to be used for said game out of a plurality of card data stored in a memory means by an instruction by said player through said input means.

According to this invention, a player can optionally select a card to be used for game by the routine for determining card to be used for game and cards can be combined according to personality of a player.

The present invention may be that said routine for computing victory point has a routine for adding point for adding a predetermined victory point to said player when said card of said player is disposed on said hex set on said area of said opponent.

According to this invention, the routine for computing victory point has a routine for adding point for adding a predetermined victory point to the player when the card of the player is disposed on the hex set on the area of the opponent. Therefore, the victory point can be obtained by controlling the hex of the opponent also. And, strategic evolution is possible in fighting for hex without distinction of superiority or inferiority of a card, and the interesting card game can be provided.

The present invention is that said card to be used for game includes a unit card on which parameters of attack force and defense force are set, and in said routine for adding point, a predetermined victory point is added to said player in only case where said unit card is on said hex set on said area of said opponent.

According to this invention, the victory point can not be obtained if the unit card on which the parameters of attack force and defense force are set is not used. Then, the player actively takes a strategy of attacking the area of the opponent using the unit card, and the player can enjoy tricks between the player and the opponent, such as in the battle between both unit cards and the extremely interesting card game can be provided.

The present invention is that said card game program is a program for getting said computer to further execute a routine for setting and controlling action point (a card game program CGP, for instance) for setting and controlling said action point for both said player and said opponent, and said routine for setting and controlling action point has a routine for limiting card remove for limiting execution of said routine for disposing card or said routine for removing card by said player through said input means so as not to make said action point less than zero (0) during the same turn after subtracting a predetermined point of said action point when said routine for disposing card or said routine for removing card is executed.

According to this invention, free combination between the actions of disposing and removing the card is possible as long as such combination is within the action point. And, the player can select an action in wide range of choice and can enjoy high strategy.

The present invention is that judgment in said routine for judging victory is as to whether or not said predetermined victory condition is satisfied till finish of the next turn of said opponent after finishing said turn in which said victory declaration is declared when said victory declaration is declared by said routine of victory declaration.

According to this invention, the player can enjoy thrilling evolution of the game having a possibility of reversing in only one battle since the victory condition is judged between finish of one's own turn and finish of the next turn of the opponent even if the victory declaration is declared.

The present invention is that said card to be used for game includes a territory card on which parameter concerning quantity of support necessary when a supported card functions is set, and said supported card on which parameter concerning necessary support number by said territory card is set (a unit card, a force card, and an option card, for instance), and said card game program is a program for getting said computer to execute a routine for computing support/hold quantity (a support/hold quantity computing program SHP, for instance) for watching a supporting state in said area by said territory card, computing and judging excess or deficiency of necessary support number (necessary hold, for instance) of said supported card, and executing a process for destroying said supported card when said supporting state of said area is changed in such a state that said support number necessary for said supported card disposed on said area is not satisfied.

According to this invention, a player can enjoy thrilling evolution of the game having a possibility of reversing in only one battle since the process for destroying the supported card is executed when the state of supporting area is changed into such a state that necessary support number of the supported card disposed on the area is not satisfied by the routine for computing support/hold quantity.

The present invention is that said routine for destroying has a routine for displaying movement of said supported card which has been disposed and displayed on said area to a wastepile rest outside said area.

According to this invention, the process for destroying is executed, displaying the movement of the supported card which has been disposed and displayed on the area to the wastepile rest outside the area, thereby the player can immediately confirm the destroyed card.

The present invention is that said routine for judging victory has a routine for comparing said victory points of said player and said opponent which are computed by said routine for computing victory point with each other and judging as to whether at least a part of said victory conditions is satisfied.

According to this invention, the judgment of victory or defeat does not simply depend on the distinction of superiority or inferiority of a card, but on the number of the victory point determined by the location form of the card, then a strategic element can be introduced in the game.

The present invention is that said card to be used for game includes a unit card on which parameters of attack force and defense force are set, and furthermore said card game program is a program for getting said computer to execute a routine for supplementing hand for executing a process (the game turn control program GTP, for instance) for taking a card from said talon according to number of said unit card disposed on said hex of one's own area during one's own turn and adding to one's own hand.

According to this invention, a card can be taken out of the talon according to the number of the unit cards disposed on the hex of one's own area by the routine for supplementing hand, thereby a player can enjoy brain play using the unit card.

The present invention is that said routine for removing card has a routine of displaying movement of said card between said areas of said player and said opponent by an instruction by said player through said input means.

According to this invention, the player can enjoy dynamic evolution of the game by moving the card in all directions between both areas of the player and the opponent since the movement of the card between both areas can be displayed by the routine for removing card.

DESCRIPTION OF THE PREFERRED EMBODIMENTS

An embodiment of the present invention will now be explained hereinafter, referring to drawings.

Figure 1:
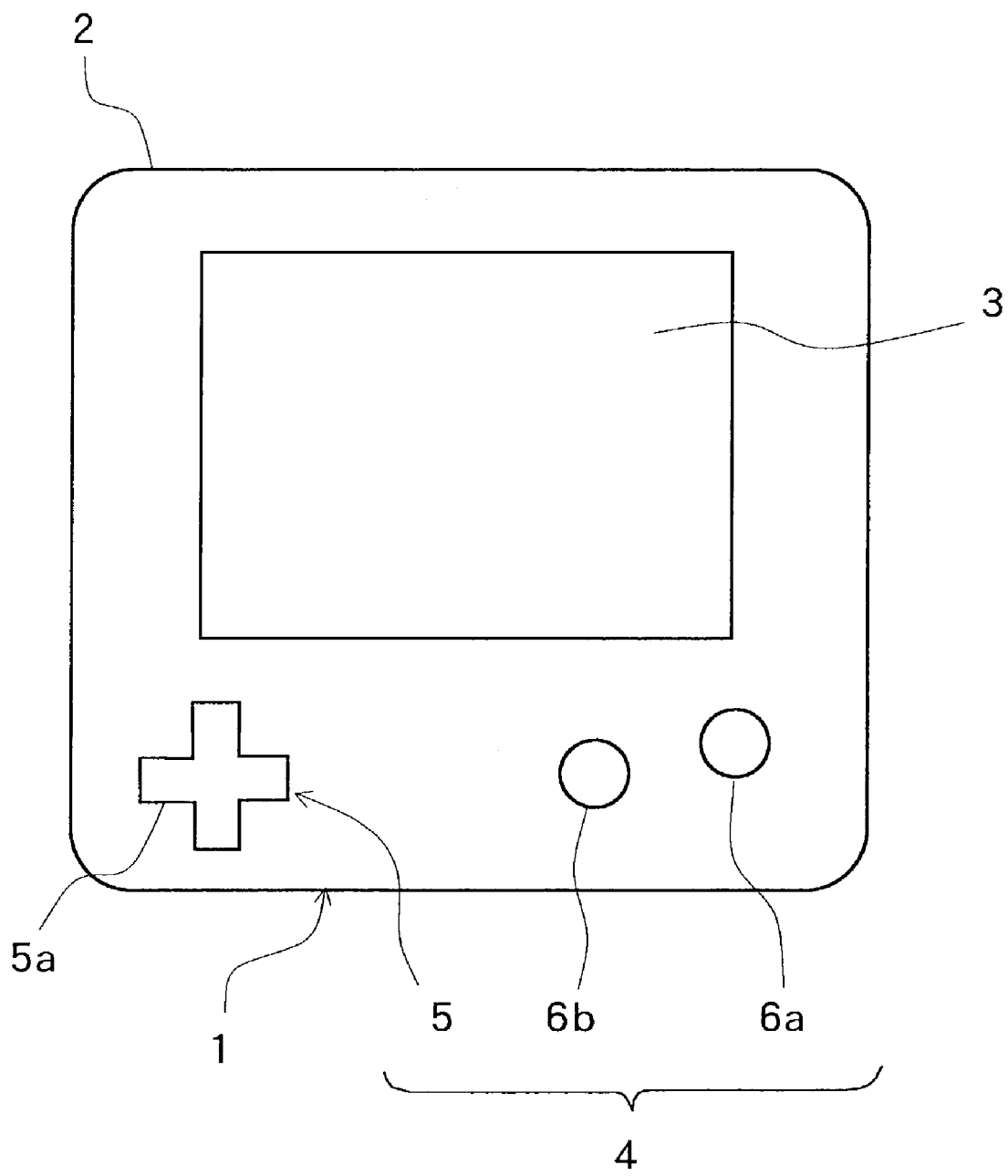
FIG. 1 is an external view of a portable game machine to which the present invention is applied.
Figure 2:
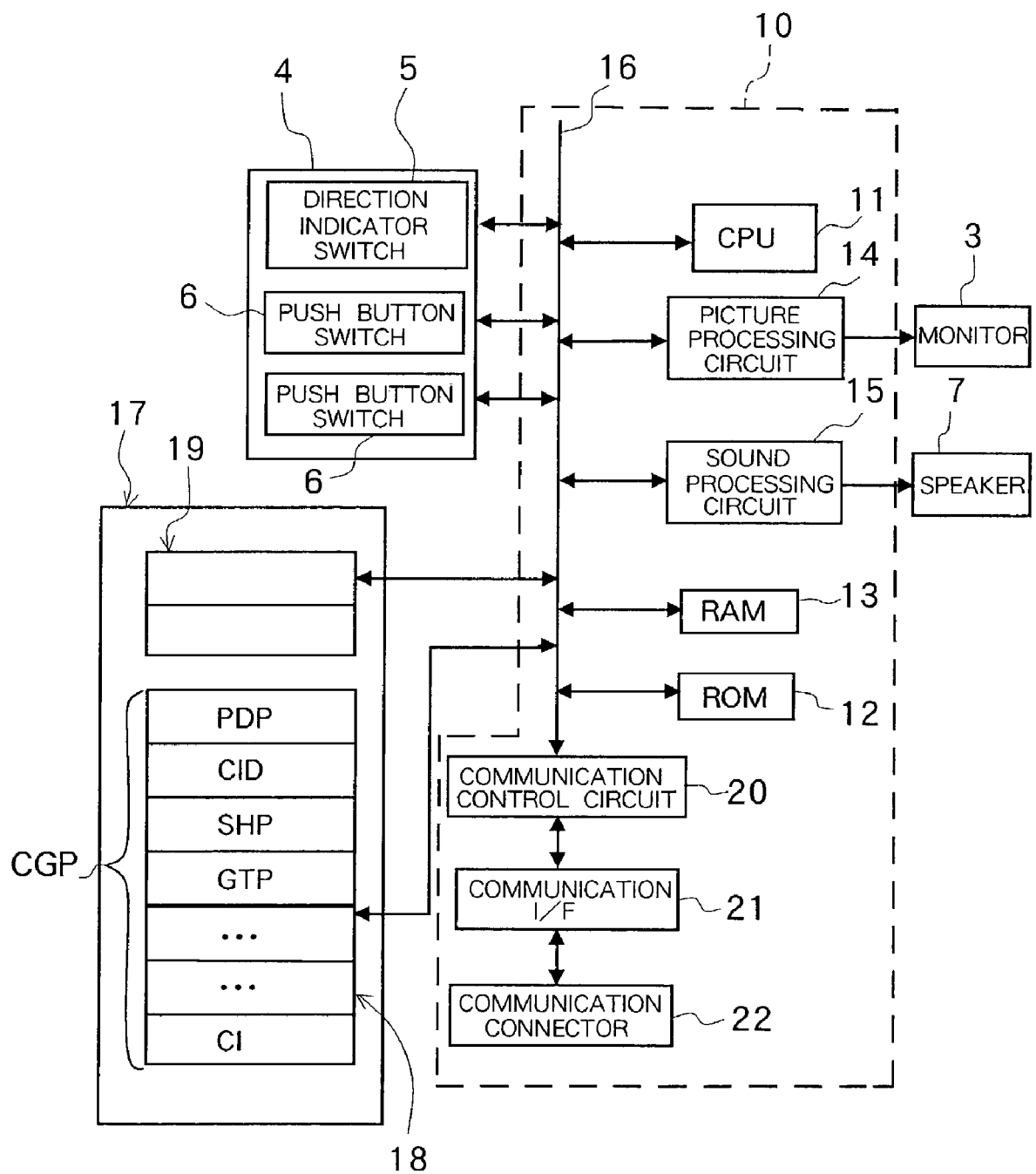
FIG. 2 is a control block diagram of the game machine of FIG. 1.
Figure 3:
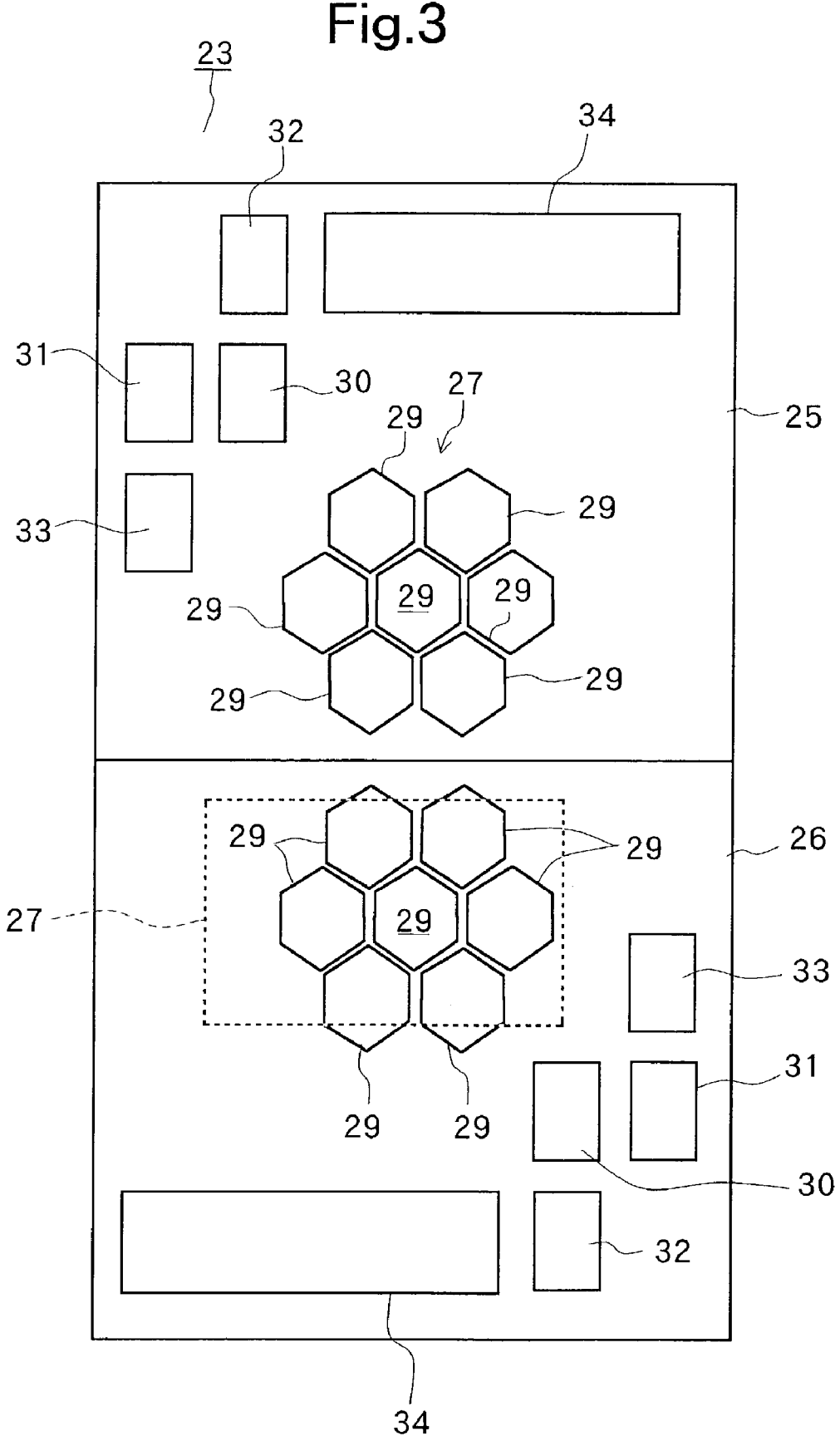
FIG. 3 is a view for showing an example of a place displayed on a display where a game is played.
Figure 4:
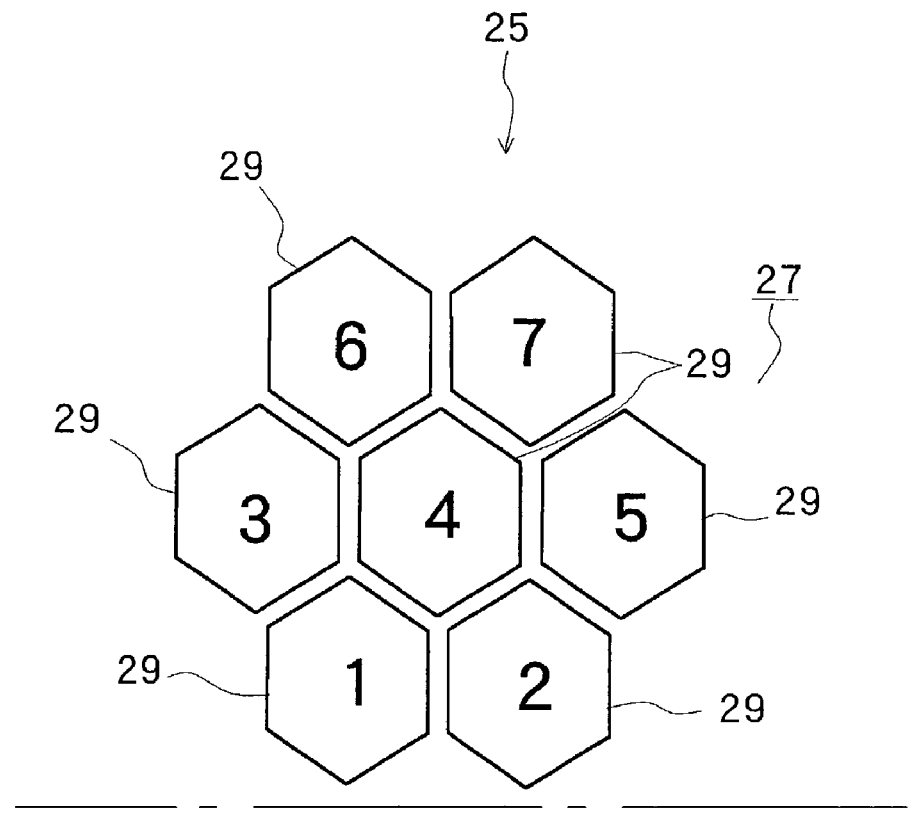
FIG. 4 is a view for showing a correspondence relation between hexs comprising respective areas.
Figure 4:
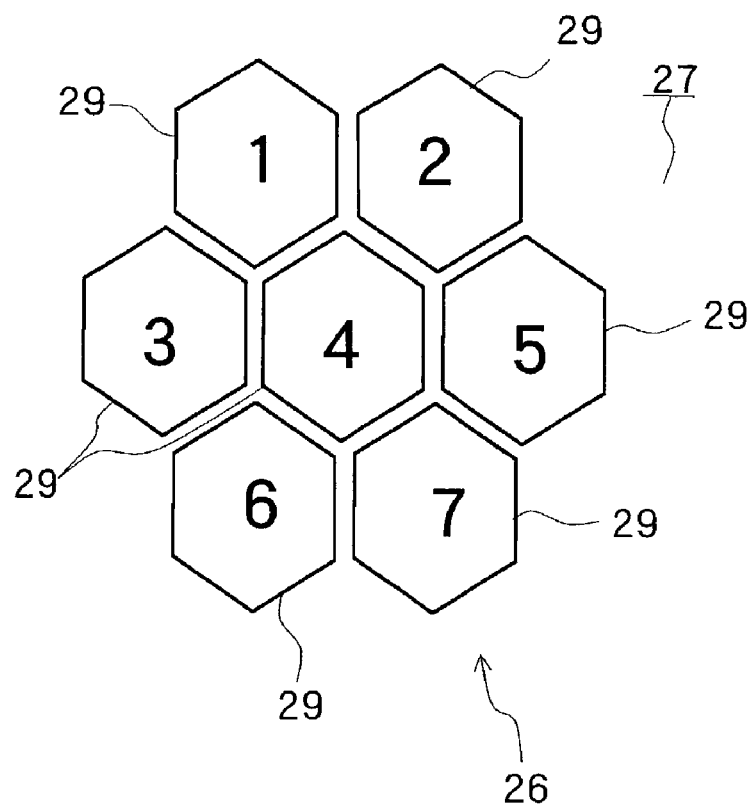
Figure 5:
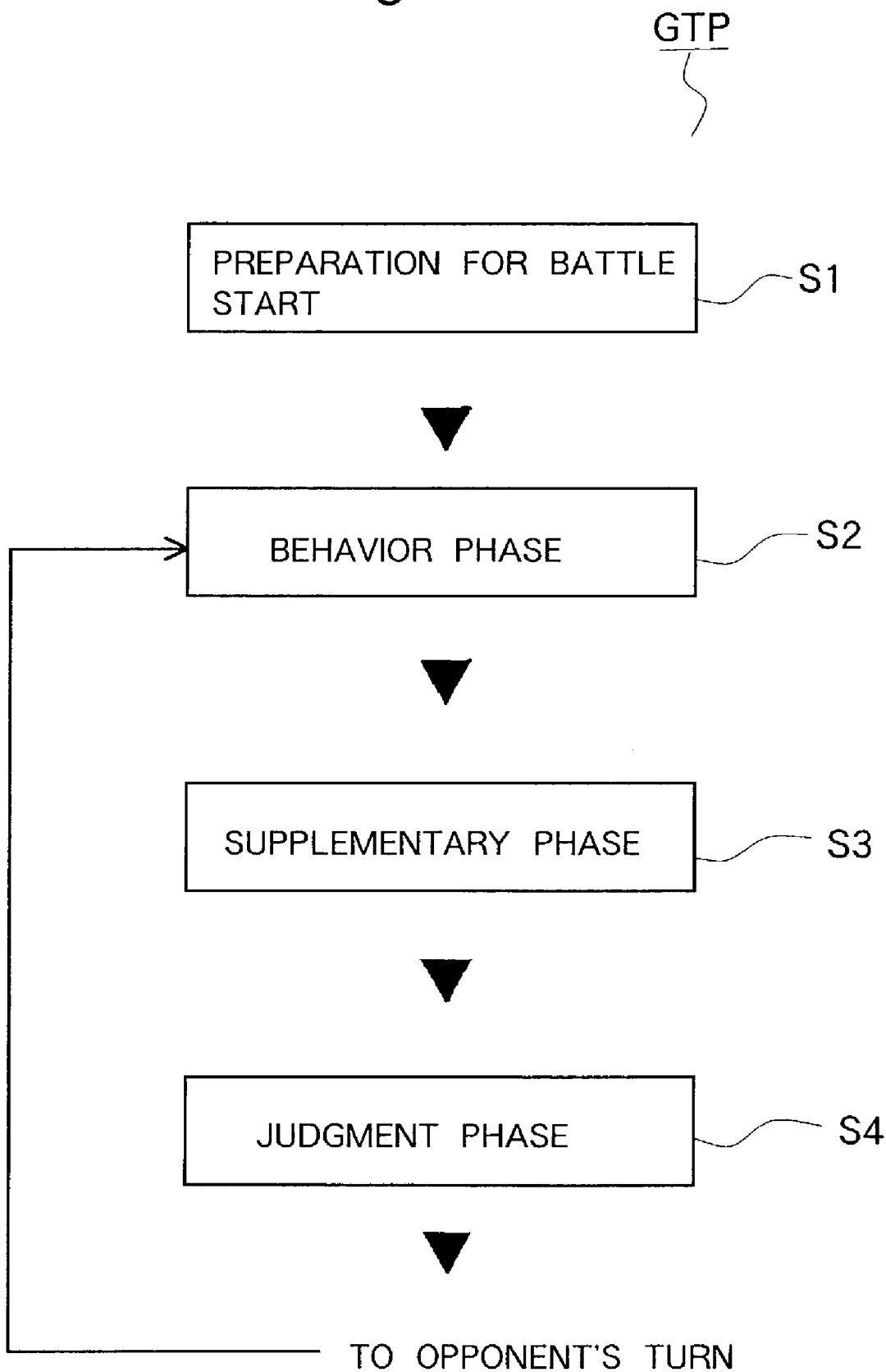
FIG. 5 is a view for showing an example of a game turn control program.
Figure 6:
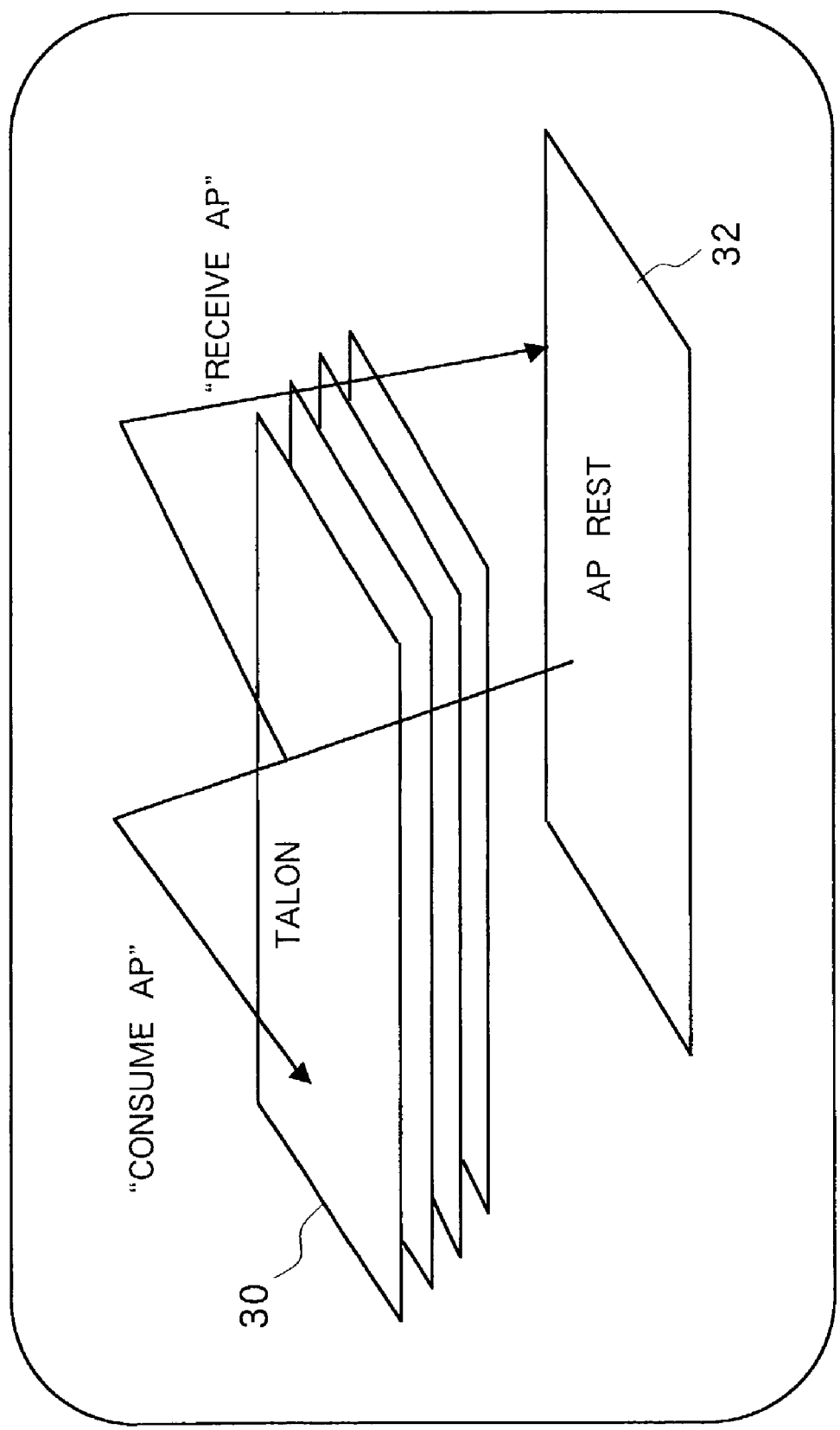
FIG. 6 is a typical view for showing exchange of a card between a talon rest and an action point (AP) rest.
Figure 7:
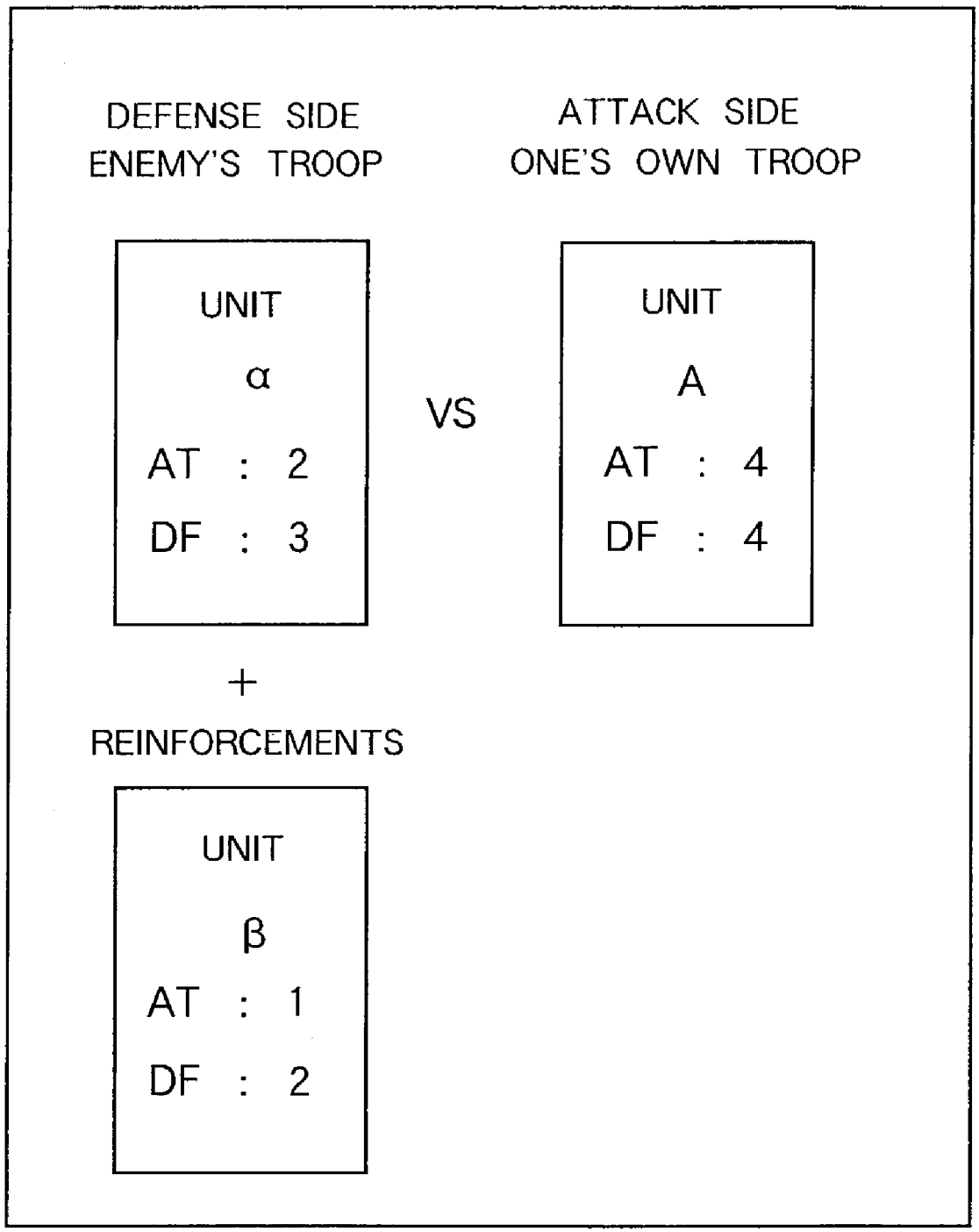
FIG. 7 is a view for showing an example of a battle.
Figure 8:
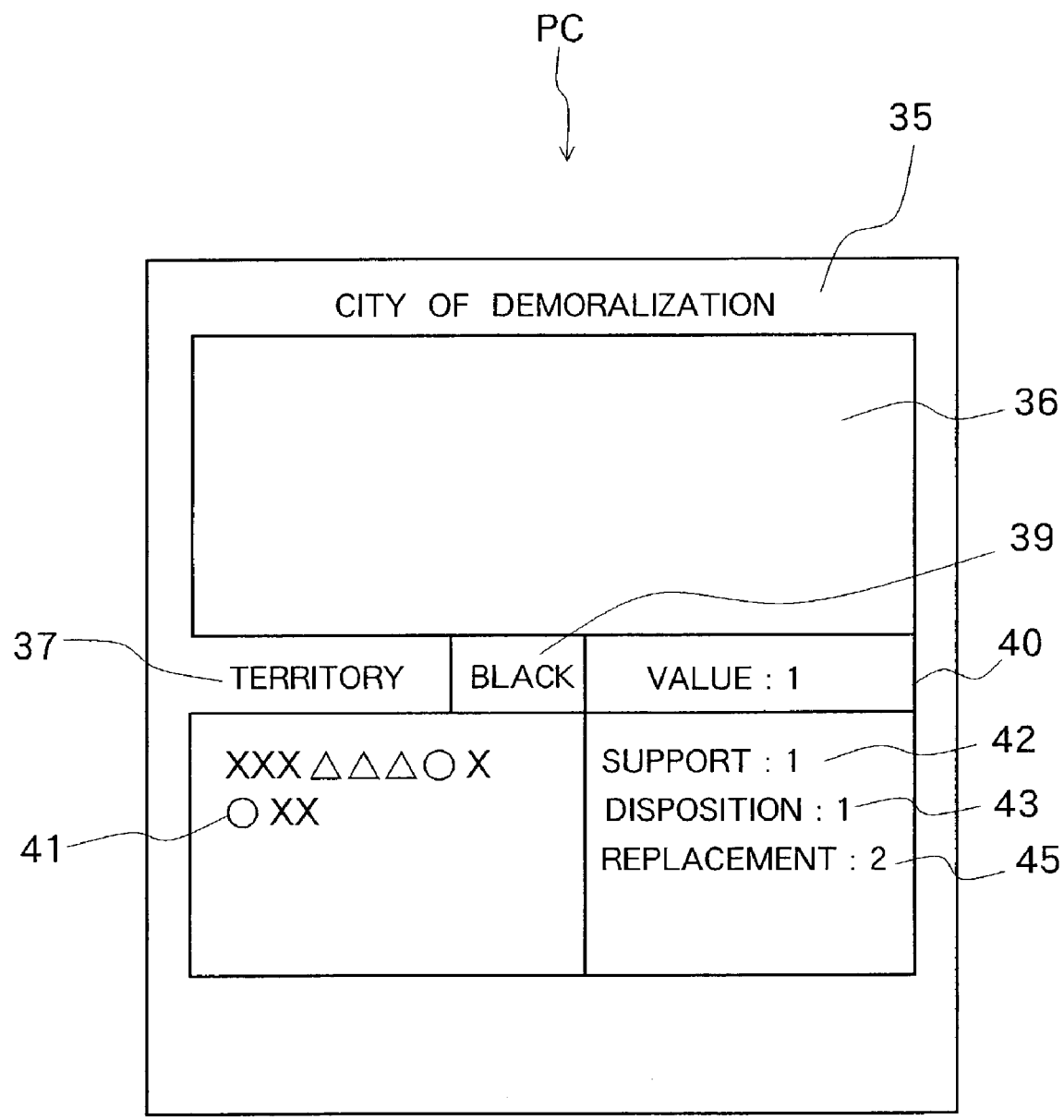
FIG. 8 is a view for showing an example of a territory card.
Figure 9:
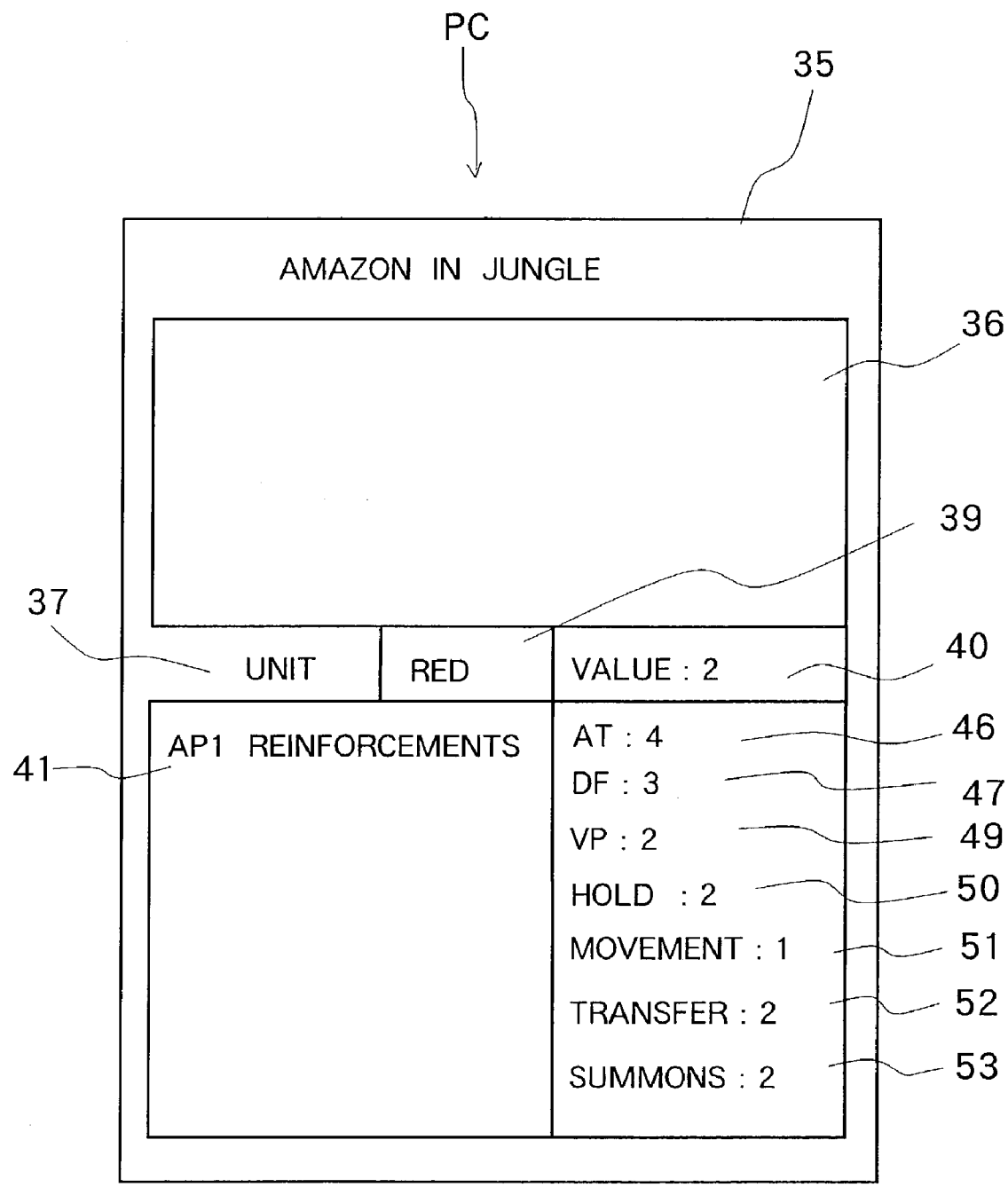
FIG. 9 is a view for showing an example of a unit card.
Figure 10:
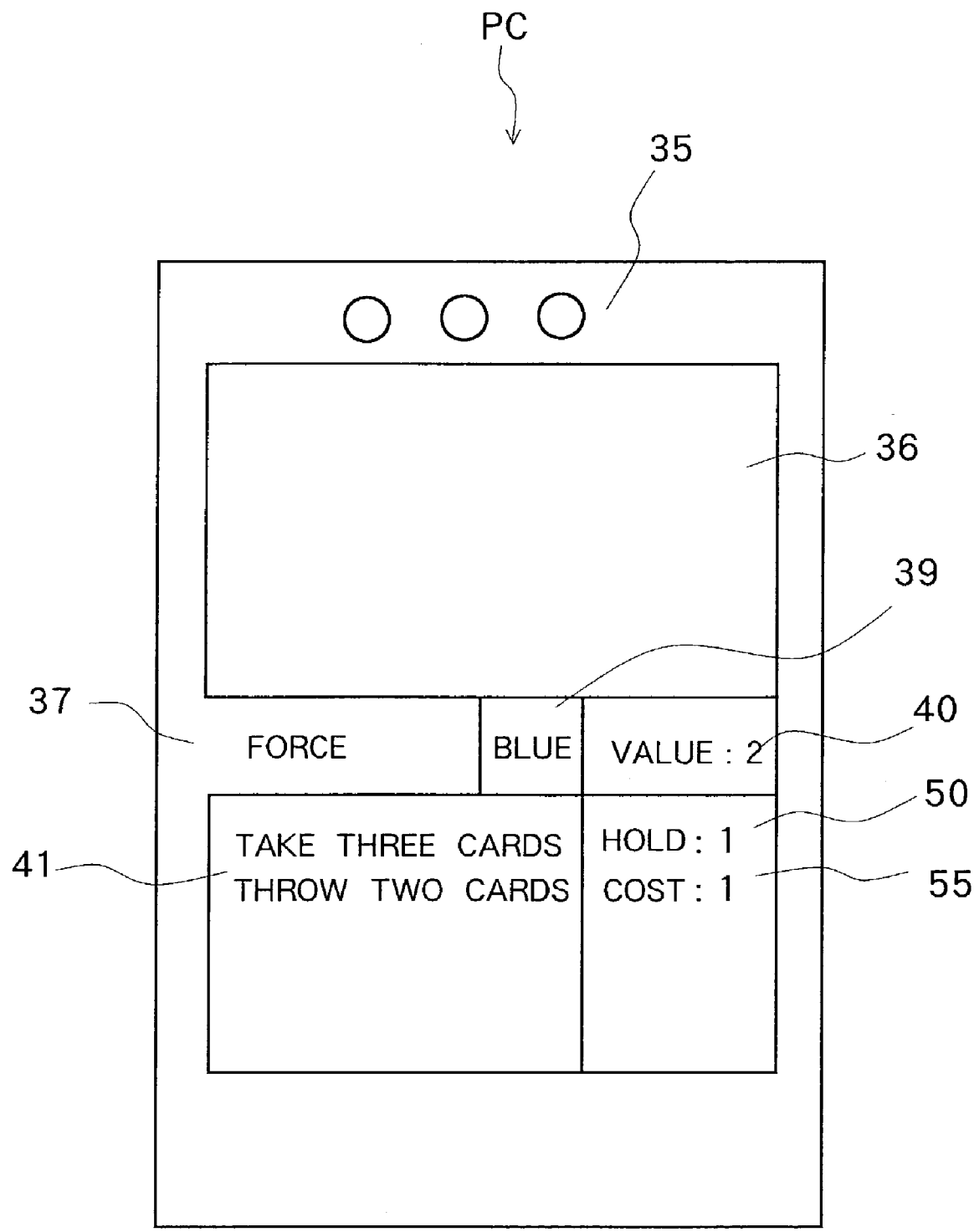
FIG. 10 is a view for showing an example of a force card.
Figure 11:
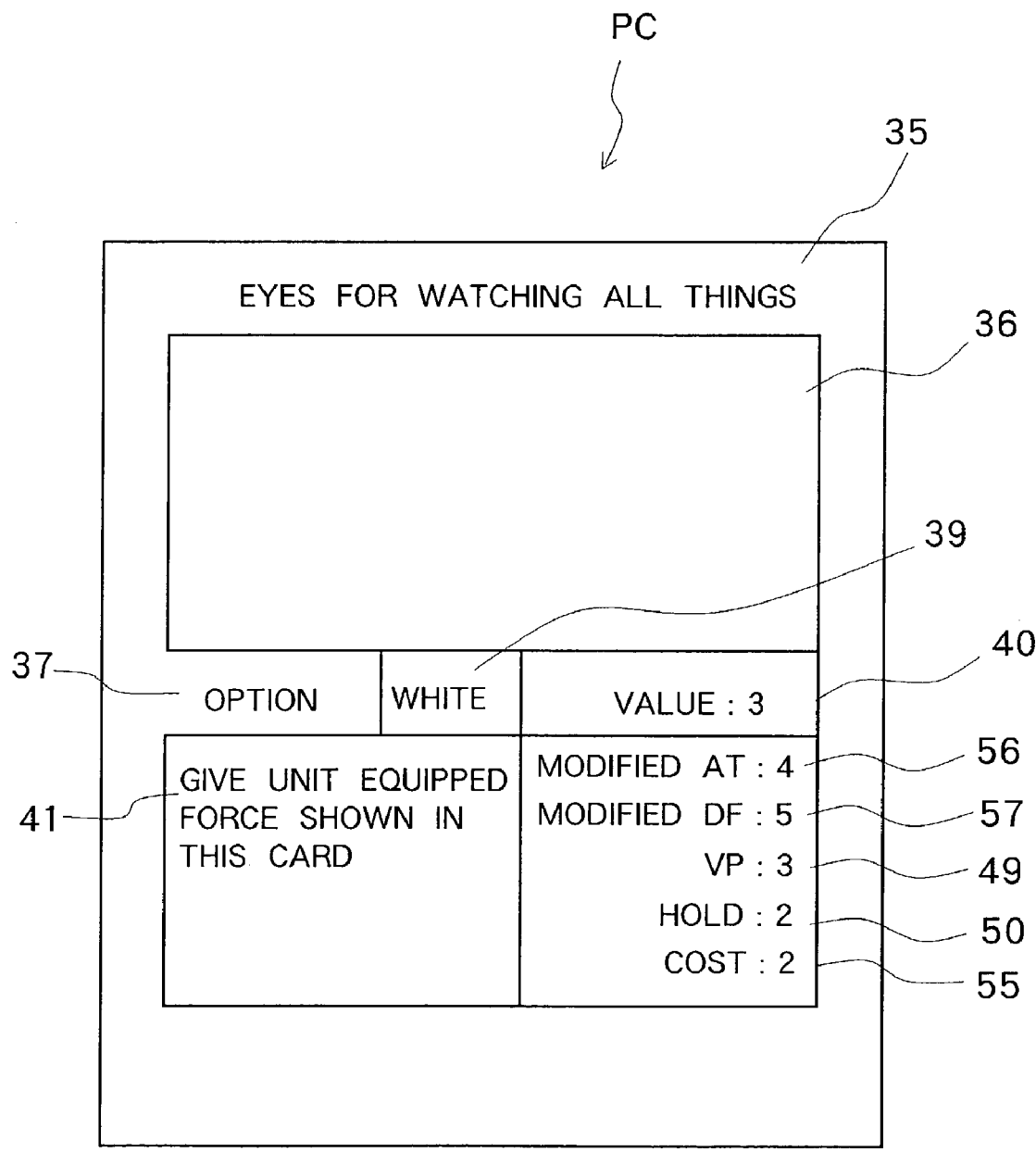
FIG. 11 is a view for showing an example of an option card.

FIG. 1 is an external view of a portable game machine to which the present invention is applied, FIG. 2 is a control block diagram of the game machine of FIG. 1, FIG. 3 is a view for showing an example of a place displayed on a display where a game is played, FIG. 4 is a view for showing a correspondence relation between hexes comprising respective areas, FIG. 5 is a view for showing an example of a game turn control program, FIG. 6 is a typical view for showing exchange of a card between a talon rest and an action point (AP) rest, FIG. 7 is a view for showing an example of a battle, FIG. 8 is a view for showing an example of a territory card, FIG. 9 is a view for showing an example of a unit card, FIG. 10 is a view for showing an example of a force card, and FIG. 11 is a view for showing an example of an option card.

FIG. 1 shows a portable game machine as a game machine comprising a game system. A portable game machine 1 has a main body 2, a liquid crystal monitor 3 as a display unit, attached to the main body 2 and an input device 4. The input device 4 has a direction indicator switch 5 and a plurality of push button switches 6a, 6b. The direction indicator switch 5 has a cross type of operation member 5a, for instance, and outputs a signal corresponding to an operation in up and down directions and in right and left directions of the operation member 5a (the operation of pushing down the end portion of the upper portion, the lower portion, the right portion or the left portion of the operation member).

A structure of such input device 4 is well-known, so various transformation is possible. For instance, four push buttons may be respectively located in upper and lower hands and in right and left hands, in place of the operation member 5a. The number of the push button switches 6a, 6b and their location may be changed in various forms. In the explanation described hereinafter, the push button switch 6a is referred to as A button, and the push button switch 6b is referred to as B button. But, both push button switches are expressed as the push button switch 6 when it is not necessary to differentiate both from each other. In addition, the game machine 1 is provided with a power switch, an operation member for adjusting sound volume and the like, but these are omitted.

FIG. 2 shows a structure of a control unit 10 provided at the game machine 1. The control unit 10 is comprised of a computer making use of a microprocessor, which main body is a CPU 11. A ROM 12 (read only memory) and a RAM 13 (random access memory) as a main memory, a picture processing circuit 14 and a sound processing circuit 15 are respectively connected with the CPU 11 through a bus 16. A program necessary for basic control of the game machine 1 (start processing, for instance) is stored in the ROM 12. A work area with respect to the CPU 11 is secured in the RAM 13. The picture processing circuit 14 controls the liquid crystal monitor 3 according to a picturing instruction from the CPU 11 so as to display a predetermined picture on its scope. The sound processing circuit 15 produces an analog sound signal according to a pronouncing instruction from the CPU 11 so as to output to a speaker 7.

The respective switches 5, 6 of the input device 4 are connected with the CPU 11 through the bus 16, thereby the CPU 11 can judge the state of operating of the respective switches 5, 6. Besides, an external memory 17, which is an object different from the control unit 10, is connected with the bus 16. The external memory 17 is comprised of a cartridge attachably and detachably attaching to the main body 2, for instance, and a ROM 18 as memory medium and a RAM 19 (read-write storage element) as a reloadable user memory are provided therein. Programs, such as a card game program, and various kinds of data necessary for the execution of the program are stored in the ROM 18 in advance. The reloadable ROM, such as a flash memory, is used as the memory 19, and save data of a game, for instance, are stored in the memory according to necessity. Various storage mediums, such as a magnetic storage medium, an optical storage medium and a photoelectric magnetic storage medium, may be used as the storage medium of the external memory 17, in addition to a semiconductor storage element. On this occasion, an interface circuit intervenes between the bus 16 and each element, if necessary, but this is not shown. Various kinds of control units 10 may be used without limiting to the above-mentioned structure.

A communication control circuit 20 is connected with the CPU 11 through the bus 16 in order to connect the game machine 1 with a predetermined communication line, an another game machine or the like. A communication connector 22 is connected with the communication control circuit 20 through a communication interface 21. As the communication control circuit 20, one functioning as a modem or a network interface by combining a DSP (digital signal processor) and a software with each other, for instance, may be utilized. The communication connector 22 and/or the interface 21 may be provided as a peripheral equipment to be connected with the game machine 1 outside.

The program stored in the ROM 18 of the external memory 17 is loaded to the RAM 13 so as to execute this program by the CPU 11 in the game machine 1 having the above-mentioned structure, thereby the card game program according to the present invention is started and people can enjoy playing various kinds of games on the scope of the monitor 3. Besides, the game machine 1 is connected with a predetermined network, controlling the communication control circuit 20, thereby messages can be exchanged and a pitched battle type of game can be enjoyed between this game machine 1 and an another game machine.

When a predetermined initializing operation (power-on operation, for instance) is executed in the game machine 1, the CPU 11 firstly executes predetermined initializing processing according to the program of the ROM 12. When initializing is finished, the CPU 11 starts to read a card game program CGP according to the present invention stored in the RAM 18 of the external memory 17, and starts game processing according to the program. When a player operates the input device 4 so as to execute a predetermined game start operation, the CPU 11 starts various kinds of control necessary for the execution of the game according to the routines of the card game program CGP.

At the time of start of the game, the CPU 11 displays a game scope 23 on the monitor 3 according to a screen display program CGP determined in the card game program CGP stored in the ROM 18 of the external memory 17. The game scope 23 is controlled to be displayed in such a manner that the whole is divided into two upper and lower areas by the screen display program PDP, as shown in FIG. 3. The upper area in the figure is set as a place 25 of an opponent's player (or a player to be played by the CPU 11 on the basis of predetermined algorithm stored in the card game program CGP) and the lower area in the figure is set as a place 26 of one's own player. In order to make the explanation simple, the opponent who plays a game with a player will be explained hereinafter as a player played by the CPU 11 on the basis of the predetermined algorithm stored in the card game program CGP. This is completely the same in the case where the opponent's player plays a game by actually operating the input device 4 (including a remote operation through the communication control circuit 20 or the like).

The location of the places 25, 26 is point symmetry in the upper portion and the lower portion. An area 27 to be a battle place of the card game is set in the place 26 (only place 26 of one's own player will be explained hereinafter since the place 25 is the same as the place 26, and in the explanation of the places 25, 26, the same number as each portion in the place 26 is used for each portion in the place 25 of the opponent's player and the explanation of the portion attaching the same number thereto is omitted). The area 27 has seven hexagonal areas each called "hex" 29 on which a card is put. The seven hexes 29 are located such that six hexes 29 are located, enclosing the periphery of one hex 29 located at the center. How many hexes 29 the area 27 is comprised of is optional, and can be properly set according to difficulty of a game or an age of a subject for a player.

On the right hand of the area 27 in the figure, a talon rest 30, a wastepile rest 31, an action point rest 32 and a counter display area 33 are set and displayed. Furthermore, a hand display area 34 is set and displayed on the lower hand of the area 27. On this occasion, how to display such respective card rests or the counter display area 33 is completely optional, and various kinds of forms or transformations can be adopted. And, a card is located and displayed on the talon rest 30 in such a state that a common face of the card (back face) is visible, and a card destroyed and already used during the progress of a game is displayed on the wastepile place 31 in such a state that a text face (surface) of the card is visible.

Prior to the start of the card game, a player executes the action for obtaining cards to be used in a card game to be played from now on, that is, obtaining cards to be used in battle. This is executed in such a manner that a proper push button switch or a proper direction indicator switch of the input device 4 is operated so as to execute a card information evolution program CID in the card game program CGP by the CPU 11. On this occasion, this action for obtaining cards may be taken in such a manner that a proper event program concerning obtaining cards is stored in the card game program CGP and a player obtains cards at the result of the execution of the event program (for instance, a player obtains cards given by somebody or by buying at a store), without simply operating the input device 4.

By the card information evolution program CID, card data CI corresponding to the forty (40) cards initially set in advance in the card information evolution program CID is read out of the card data CI stored at a proper address position of the ROM 18 in a case of first play for a player so as to register in the RAM 19 as the cards to be initially used by the player and so as to set as the cards to be used in the game to be played from now on. When forty (40) cards (the number of the cards can be optionally set, without limiting to forty.) to be used in the card game are set, the CPU 11 displays the picture of the card on the talon rest 30 displayed on the monitor 3 through the picture processing circuit 14, facing the common face (back face) of the card to a player.

The forty cards firstly delivered to the player are the same, even if any player plays. But, respective data concerning two hundred (200) cards or so (The number of the cards stored is optional, and any number of the cards may be stored according to memory capacity. And, the card information obtained by a player by playing against an outside player through the communication control circuit 20 may be also stored.) which are different are stored in the card data CI, and the player can gradually get a new card when the player wins a card game or by various kinds of events prepared in the card game program CGP. Therefore, the card gotten by the player is stored in the RAM 19 of the external memory 17 as player's own card holding data. When the card to be used in the game by the player is selected from many cards owned by the player, four (4) cards or more having the same title can not be selected, and the card information evolution program CID watches the card selected by the player by operating the input device 4 by the player, and watches so as not to select four or more cards having the same title. When such cards having the same title are selected, the card information evolution program CID invalidates the selection and executes a process for excepting from the forty cards (or a process for not adding to the forty cards).

The cards which can be produced by the card information evolution program CID on the basis of the card data CI stored in the ROM 18, two hundred kinds of cards, for instance, are classified into the following two categories by the contents of the card data CI. That is, the cards are classified by "KIND" and "COLOR".

The following four kinds of "KIND" are defined.

1. "TERRITORY CARD" is the card for exhibiting various kinds of effects by putting on the place. This card is referred to as "TERRITORY" hereinafter.

2. "UNIT CARD" is the card to be the key of a battle. This is referred to as "UNIT" hereinafter.

3. "FORCE CARD" is the card for exhibiting a force, such as magic, through which various effects are displayed. This card is referred to as "FORCE" hereinafter.

4. "OPTION CARD" is the card for adding various kinds of powers to a unit to be displayed by the unit card. This card is referred to as "OPTION" hereinafter.

Besides, the following five (5) colors are defined as "COLOR".

1. "WHITE": This category card is the card suitable for a strategy of entering into enemy's territory which is an opponent player's place 25 and keeping the place so as to get a point. In "WHITE", there are many "UNIT" of which DF value (defense force) is high. "WHITE" card concerning "FORCE" has a characteristic of sweeping away the cards on the place of one's own side and enemy's side.

2. "BLACK": In this category, there are many "UNIT" of which AT value (attack force) is high but DF value is low, and "BLACK" card is strong in suicidal attack. "BLACK" category "FORCE" is destructive in many cases, and can attack "UNIT", "TERRITORY" and the opponent's player's hand.

3. "RED": There are many powerful "UNIT" rather than the other colors. "RED" category "UNIT" exerts distinguished strong power in a battle between both "UNIT". In "RED", "FORCE" card is strong in removing an opponent "UNIT" and in rapid march.

4. "BLUE": This category "UNIT" is unreliable in numerical power, but there are many "FORCE" which has specific force for making sport of an opponent's behavior. A tricky battle is possible with "BLUE" card. Besides, many "BLUE" card has effects capable of drawing a card from talon.

5. "NO COLOR": This category card is poor in a kind and power of "UNIT", but can be used even if "TERRITORY" has any support color, and its flexibility is high. It is recommended to use this card for supplementing the part in which each power is weak.

Subsequently, a displayed picture PC of four kinds of cards above-mentioned on the monitor 3 will now be explained. As already mentioned, the picture PC of each card is produced by the CPU 11 on the basis of the card data CI stored in the ROM 18. Therefore, all the data described hereinafter comprising the picture PC of each card (the data corresponding to the items as shown by marks 35 through 57, for instance) are stored in the ROM 18 every each card as the card data CI.

The card as shown in FIG. 8 is the territory card, and the territory card can exhibit various effects by being put on the area 27. The picture PC of the territory card displays card title 35 for showing name of a card, an illustration 36 (Concrete illustration is not shown in the figure.) corresponding to the card title 35, kind 37 of a card ("TERRITORY" for showing the territory card is displayed here.), color 39 of a card as a category of a card ("BLACK" in the figure), value 40 (one (1) in the figure) of a card at the time of exchanging a card according to a point after finishing a game, text space 41 on which effects to be exhibited by putting the card on the area 27 are described, quantity of support 42 necessary for supporting the other kind of card by putting the card on the area 27, disposition cost 43 for showing quantity of action point (AP) necessary for putting the card on the area 27 and replacement cost 45 for showing quantity of the action point (AP) necessary for replacing the opponent's territory card by one's own territory card. On this occasion, how to display various kinds of such card data CI with the picture PC is not limited to one as shown in FIG. 8, but various display forms can be adopted. This is the same concerning the other cards described hereinafter.

The card as shown in FIG. 9 is the unit card, the explanation of the item the same as the item as shown in FIG. 8 is omitted by using the same number. The picture PC of the unit card is comprised of AT value 46 for showing attack force against an opponent's card, DF value 47 for showing defense force against an opponent's card, victory point (is shown by "VP") 49 to be obtained at the time of win in a battle, quantity of support by the territory card necessary for using the card, that is, necessary hold 50, quantity of the action point necessary for moving the card on the area 27, that is, movement cost 51, quantity of the action point necessary for moving the card to an opponent's area, that is, transfer cost 52, and quantity of the action point necessary for putting the card from hand on the area 27, that is, summons cost 53 and the like.

The card as shown in FIG. 10 is the force card, and the explanation of the item the same as the item as shown in FIG. 8 or FIG. 9 is omitted by using the same number. Generally, the card can be basically used in one's own turn only, but the card on which "INTERFERENCE" is described in the text space 41 of the force card can be also used in an opponent's turn. On this occasion, cost 55 for showing quantity of the action point (AP) necessary for using the card is described on the picture PC of the force card.

The card as shown in FIG. 11 is the option card, and can be basically used concerning "UNIT" of one's own troop or enemy's troop. The explanation of the item the same as the item as shown in FIG. 8 through FIG. 10 is omitted by using the same number. By using this card for some "UNIT", the power of the contents described on the text space 41 is added to the "UNIT". The picture PC of the option card displays modified attack force (AT) 56 and modified defense force (DF) 57 when AT or DF of "UNIT" for which the option card is used is modified.

Subsequently, "HOLD" and "SUPPORT" shown on the various kinds of cards above-mentioned will now be explained. "SUPPORT" is the numeric value as shown in quantity of support 42 mainly described on the territory card, and is the numeric value necessary when the other card functions on the area 27 excepting a part. When the territory card is disposed on the hex 29 of the area 27, the quantity of support 42 shown in the territory card is given to one's own troop concerning "COLOR" of card shown in the territory card. The player can use the different kinds of card in his hand, having the same color as the territory card disposed. On this card, necessary "HOLD" corresponding to the total value of the quantity of "SUPPORT" 42 every each color which is respectively shown on the territory cards disposed on the area 27 is shown. On the contrary, if the numeral of "HOLD" every "COLOR" of the cards in hand is bigger than the total value of the quantity 42 of SUPPORT respectively shown on one's own territory cards having the corresponding "COLOR", disposed on the area 27, such card can not be used.

On this occasion, for the card for which SUPPORT by the territory card is unnecessary, that is, for the card on which "HOLD" is not set, SUPPORT by the territory card on the area 27 is unnecessary, and such card can be always used with respect to the area 27. The card, of which HOLD becomes short by decreasing the total value of SUPPORT of one's own troop's territory cards for some reason, of the cards disposed on the area 27, is destroyed at the same time when HOLD becomes short. The card generating "SUPPORT" exerts the "SUPPORT" effect on all of the same owner's cards.

A SUPPORT/HOLD quantity computing program SHP of the card game program CGP judges the state and the change of "SUPPORT" by the territory card of the area 27 and excess or deficiency of the necessary quantity of "HOLD" of the card disposed on the area 27 (that is, the necessary number of SUPPORT by one or more territory cards) with respect to the present quantity of "SUPPORT" of the area 27, and judges the card in which HOLD is short and executes a process for subsequent "DESTRUCTION" whenever the card is removed on the area 27 during a play. In case where a card is disposed on the place in such a state that necessary HOLD (that is, the total of the quantity of SUPPORT) is short as the result, an alarm such as "HOLD short" is displayed to a player. And, in case where the territory card of one's own troop is lost after "REPLACEMENT" by the territory card of the opponent's side and HOLD on the area 27 is short, a process for "DESTRUCTION" of the corresponding card of one's own troop is executed. The movement of the card "destroyed" from the hex to the wastepile rest 31 is displayed on the corresponding monitor 3. Let us suppose the following five (5) cards are supported on the area 27 by the player.

1. "BLUE,BLUE" HOLD, that is "UNIT" in which necessary HOLD is two (2)

2. "BLUE" HOLD, that is, "UNIT" in which necessary HOLD is one (1)

3. "BLUE,BLUE" HOLD, that is "OPTION" in which necessary HOLD is two (2)

4. "BLUE" SUPPORT, that is "TERRITORY" in which quantity of SUPPORT is one (1)

5. "BLUE" SUPPORT, that is "TERRITORY" in which quantity of SUPPORT is one (1)

If one "TERRITORY" of "BLUE" SUPPORT is left from the area 27 in the above-mentioned state, "UNIT" and "OPTION" of "BLUE,BLUE" HOLD, that is, in which necessary hold is two (2) are destroyed. And, "UNIT" of "BLUE" HOLD, that is, in which necessary hold is one (1) remains on the area 27. The SUPPORT/HOLD quantity computing program SHP computes and judges the deficiency of HOLD of "UNIT" and "OPTION" of "BLUE, BLUE" HOLD, that is, in which the necessary HOLD is two (2) and executes a process for "DESTRUCTION" concerning the cards of "UNIT" and "OPTION" in which HOLD is short when one "TERRITORY" of "BLUE" SUPPORT is left from the area 27. That is, the display of the card which has been displayed on a specific hex 29 on the area 27 on the monitor 3 is stopped and the display is controlled in such a way that the card is moved to the wastepile rest 31 of the place 25 or 26 on the owner's side of such card. And, "UNIT" of "BLUE" HOLD, that is, in which necessary HOLD is one (1) is not "destroyed" since HOLD in the card is not short.

When the card information evolution program CID sets the forty cards to be used in the card game concerning a player and the player played by the CPU 11 so as to display on the talon rest 30 in the above-mentioned way, the CPU 11 reads out a game turn control program GTP of the card game program CGP and proceeds to the card game on the basis of the game turn control program GTP.

The game turn control program GTP determines bat first and bat last of a player and the opponent's player by some means, and executes a process of giving "two (2) VP" to the bat last player, and a process for compensating handicap of the bat last player. On this occasion, the game turn control program GTP controls to compute the present "VP" of each player every remove of the card and to always display on the counter display area 33 of the place 25 or the place 26 on the monitor 3.

Subsequently, the game turn control program GTP executes a process for taking five (5) cards from one's own talon rest 30 concerning both a player and the opponent's player so as to display on the hand display area 34. The hand is controlled to be displayed with the right side up concerning only one's own player and with the wrong side (common face) up concerning the opponent's player.

If the player is not satisfied with this hand, the player can declare "exchange of hand" by operating the input device 4. When a signal of declaring "exchange of hand" is input from the input device 4, the game turn control program GTP executes processes for giving "one (1) VP" to the opponent's player, for returning the hand displayed on the hand display area 34 to which "exchange of hand" is input to the talon rest 30, for shuffling the forty (40) cards returned and for taking five (5) cards by the player who declared "exchange of hand" again. Such "exchange of hand" can be declared up to twice in one play, and a process for "ERROR" is executed when a signal of declaring the third "exchange of hand" is input from the input device 4 so as to stop further process of "exchange of hand" and to show further exchange of hand is impossible on the monitor 3 to the player.

The game turn control program GTP enters into step S2 so as to enter in behavior phase concerning the bat first player after determining bat first/bat last and determining five hands in step S1, as shown in FIG. 5. This behavior phase is the phase to be a main of the game, and the game turn control program GTP gives the player five (5) AP of action points, and display 5 points of action point on the action point rest 32 of the corresponding place 25 or 26 with a graphic, a numeral, a card or by another method. This display may be controlled to display, moving five cards to the action point rest 32 from the talon rest 30, as shown in FIG. 6 for instance. After giving the bat first player 5 points of action point, the bat first player is requested to take concrete card action by the card game program CGP through the monitor 3. This action point (AP) is set as a point to be a standard of quantity of behavior of the game. That is, the behavior in the game using the card by the player consumes the action point owned by one's own in principle, and the player can take an action with a card at one's own discretion within the action points (AP) owned by one's own.

The action point (AP) which has not been used in one's own turn can be brought over to the next one's own turn, but the action point (AP) which can be owned by the player is a maximum of 10 AP including the action point brought over. On this occasion, the maximum action point which can be owned can be optionally set without limiting to ten (10) AP.

The player takes a card from the talon rest 30 or properly disposes the various kinds of cards in hands on each hex 29 of the area 27 of the place 25 of the opponent's side or the place 26 of one's own side. Every such action by the player, the action point (AP) of the action point rest 32 is displayed, subtracting the numeric value corresponding to the cost shown on the card. When the action point becomes zero (0) in the same turn, further action by which the action point is consumed is impossible. Such display may be that the card displayed on the action point rest 32 is returned to the talon rest 32 according to the quantity of the action point consumed, as shown in FIG. 6 for instance, in addition to the display with a numeral There are the following behaviors of consuming the action point. The card game program CGP computes for increasing or decreasing the present action point of the player at the time of judging that the player removes a card and the behavior of consuming the action point occurs, watching the player's behavior so as to display always up-to-date action point (AP) concerning each player on the action point rest 32. When the action point becomes zero (0), this is displayed on the action point rest 32 on the monitor 3 and further behavior of consuming the action point by the player through the input device 4 is invalidated so as to execute an error process for limiting the remove of a card.

Behavior of Consuming Action Point (AP)

1. Consumption of One (1) Action Point (AP)

a). To draw a card from the talon rest 30

2. Consumption of n Action Points (AP)

a). To summon one "UNIT" (Disposition of "UNIT" in the hand on the area 27 is referred to as "SUMMONS". This is the same in the following.)

b). To move one "UNIT" (Replacement of "UNIT" disposed in the area 27 on the adjacent hex 29 of the same area is referred to as "MOVEMENT". This is the same in the following.)

c). To transfer one "UNIT" (Replacement of "UNIT" disposed in the area 27 on the corresponding hex 29 of the different area is referred to as "TRANSFER". The hexes 29 corresponding to each other in the respective areas 27, 27 are ones respectively having mirror image positional relation and having the same number, as shown in FIG. 4. This is the same in the following.)

d). To use one "FORCE"

e). To dispose one "TERRITORY" on the area 27 f). To use one "OPTION"

g). To use power shown on a card one time

Subsequently, disposition of "TERRITORY" will now be explained. "TERRITORY" can be disposed when the following condition is satisfied. The game turn control program GTP judges as to whether or not the condition is met when the player disposes "TERRITORY" on the area 27, and executes a process for permitting the disposition in only case where the condition is met, and executes a process for displaying "TERRITORY" which a player tries to dispose on the corresponding hex 29.

That is, the condition for disposing "TERRITORY" is a). during one's own behavior phase, or b). to pay the disposition cost shown on a card by the action point (AP), that is, to leave the action point corresponding to the disposition cost shown on a card.

Besides, "TERRITORY" can not be always disposed on all hexes 29, and there are the following conditions for disposing on the hex.

a). It can be disposed on the hex 29 of one's own troop's area 27 where "UNIT" of enemy's troop is not disposed.

b). It can be disposed on the hex 29 supported by one's own troop. That is, it can be also disposed on the hex 29 of the area 27 on the opponent's side in case where the hex 29 on the opponent's side 27 is supported by one's own troop by transferring "UNIT" of one's own troop.

c). Only one "TERRITORY" can be disposed on one hex 29. Then, only disposition by "REPLACEMENT" is possible with respect to the hex 29 where "TERRITORY" has already been disposed.

d). A controller of "TERRITORY", that is, a controller of the hex 29 on which "TERRITORY" is disposed, basically has the right for determining to use power shown on "TERRITORY".

In case where "TERRITORY" has been already disposed without distinction of one's own troop and the opponent's side, new "TERRITORY" of one's own troop can be disposed, removing "TERRITORY" already disposed by paying "REPLACEMENT COST" shown on the card from the action point (AP). Such behavior of disposing new "TERRITORY" on the hex 29 on which another "TERRITORY" has already been disposed is referred to as "REPLACEMENT". "TERRITORY" replaced in this way is dealt with as "DESTRUCTION", and the game turn control program GTP stops displaying "TERRITORY" which has been displayed on the hex 29 so as to execute a process for returning this "TERRITORY" to the wastepile rest 32 of the owner of the "TERRITORY".

On this occasion, the process for disposing "TERRITORY" is executed in such a manner that the text surface of the disposed "TERRITORY" is displayed on the corresponding hex 29.

Subsequently, "SUMMONS" of "UNIT" will now be explained. "UNIT" can be summoned when the following condition is met, and the game turn control program GTP judges as to whether the condition is met or not when the player summons "UNIT" on the area 27, and executes a process for permitting to "SUMMON" in only case where the condition is met, and executes a process for displaying "UNIT" which the player tries to summon on the corresponding hex 29.

That is, the conditions for "SUMMONING" "UNIT" are a). during the behavior phase of one's own, b). to pay the summons cost shown on the card by the action point (AP), that is, to leave the action point corresponding to the summons cost shown on the card, c). in such a state that "SUPPORT" having the quantity the same as the quantity of HOLD shown on the card or more is disposed on the place, d). that the hex 29 on which "UNIT" is summoned is the area 27 of one's own, and e). that the hex 29 on which "UNIT" is summoned is not controlled by "UNIT" of one's own troop. On this occasion, "SUMMONS" on the hex 29 in the area 27 of one's own troop which is controlled by "UNIT" of the enemy's troop is possible. In case where "UNIT" of both one's own troop and the enemy's troop exist on the same hex 29 as the result of "SUMMONS", "BATTLE" starts. In this way, "SUMMONS" in which "BATTLE" starts is defined as "INVASION".

The process for summoning "UNIT" is executed in such a way that the text surface of the summoned "UNIT" is displayed on the corresponding hex 29.

Next, "MOVEMENT" and "TRANSFER" of "UNIT" will now be explained. As already explained, replacement of "UNIT" on the adjacent hex 29 of the same area 27 is referred to as "MOVEMENT". In case of FIG. 4., that is, in the upper or lower area 27 of the opponent's player's place 25 or one's own player's place 26, "UNIT" positioned on the hex 29 of number "2", for instance, can be "MOVED" to the hex 29 of number "1", "4" or "5" in the same area 27, and "UNIT" positioned on the hex 29 of number "4", for instance, can be "MOVED" to the hex 29 of number "1", "2", "3", "5", "6" or "7" in the same area 27.

And, replacement of "UNIT" on the corresponding hex 29 of the different area 27 is referred to as "TRANSFER". On this occasion, the hexes 29 corresponding to each other are both hexes 29 disposed at positions of line symmetry in the upper and lower areas 27 of the opponent's player's place 25 and one's own player's place 26, and the same reference number "1" through "7" is attached thereon, as shown in FIG. 4. Then, "UNIT" positioned on the hex 29 of number "2" of one's own player's place 26, for instance, can be "TRANSFERRED" to the hex 29 of number "2" of the opponent's player's place 25, and "UNIT" positioned on the hex 29 of number "4" of one's own player's place 26, for instance, can be "TRANSFERRED" to the hex 29 of number "4" of the opponent's player's place 25.

In case where "UNIT" of both one's own troop and the enemy's troop exist on the same hex 29 as the result of "TRANSFER" or "MOVEMENT", "BATTLE" starts. In this way, "TRANSFER" or "MOVEMENT" in which "BATTLE" starts is defined as "INVASION".

"UNIT" can be "MOVED/TRANSFERRED" when the following condition is met. The game turn control program GTP judges as to whether or not the condition is met when the player "MOVES/TRANSFERRS" "UNIT", and executes a process for permitting "MOVEMENT/TRANSFER" in only case where the condition is met, and executes a process for changing displaying "UNIT" which the player tries to "MOVE/TRANSFER" between the corresponding two hexes 29.

That is, the conditions for "MOVING/TRANSFERING" "UNIT" are a). during the behavior phase of one's own, b). to pay movement/transfer cost shown on the card by the action point (AP), that is, to leave the action point corresponding to the movement/transfer cost shown on the card, c). that the hex 29 which is destination of "MOVEMENT/TRANSFER" is not controlled by "UNIT" of one's own troop.

The game turn control program GTP judges as to whether or not "BATTLE" occurs as the result of movement/transfer of "UNIT" by the above-mentioned condition as to whether or not both "UNIT" of one's own player and the opponent's player exist on the same hex 29, and enters into "BATTLE" mode in the case where the judgment is that both "UNIT" of one's own player and the opponent's player exist on the same hex 29 so as to control the evolution of the game by the following conditions.

That is, "BATTLE" occurs in the case where a plurality of "UNIT" controlled by the different controllers exist on the same hex 29, as already mentioned. When the program enters in "BATTLE" mode, a). both players can not take the behavior of consuming the action point (AP) excluding interference and reinforcements till "BATTLE" finishes b). the processes for respectively seizing both damages of one's own player and the opponent's player owing to "BATTLE" are simultaneously computed, c). "UNIT" in which AT value (attack force) becomes zero or less by some effect is dealt with as "zero (0)".

d). "UNIT" in which DF value (defense force) becomes zero or less by some effect is dealt with as "DESTRUCTION".

e). in case where both "UNIT" of one's own player and the opponent's player are left on the same hex 29 as the result of "BATTLE", "UNIT" on the invasion side is "DESTROYED" at the time of finishing "BATTLE" in spite of the damage.

A concrete example of "BATTLE" will now be explained, referring to an example as shown in FIG. 7 hereinafter. When the player outputs an instruction of "TRANSFERRING" "UNIT" which is one's own "A" to the hex 29 of the opponent's player's place 25 to the CPU 11 by properly operating the input device 4 for instance, the CPU 11 judges the above-mentioned transfer condition in the game turn control program GTP. When the transfer condition is met, the CPU 11 controls to display the movement of "UNIT" which is "A" and is displayed on a specific hex 29 of one's own player's place 26 to the hex 29 of the opponent's player's place 25 corresponding to the specific hex 29.

As shown in FIG. 7, "UNIT" which is "α" of the opponent's player (shown as "ENEMY'S TROOP") has been already disposed on the hex 29 of the opponent's player's place 25, and at this time, "BATTLE" is judged by the game turn control program GTP.

Since AT value (attack force) of "UNIT" which is "α" of the opponent's player is two (2), DF value (defense force) is three (3), AT value (attack force) of "UNIT" which is "A" of one's own player is four (4) and DF value (defense force) is four (4), the game turn control program GTP computes the processes of seizing both damages by the following equation Remaining DF value of one card=(DF value of one card)−(AT value of the other card)

And, the game turn control program GTP deals with "UNIT" in which DF value (defense force) is zero or less as "DESTRUCTION".

If the opponent's player (enemy's troop) executes a process of disposing "β" card on the hex 29 where BATTLE" is fought as "REINFORCEMENTS", "REINFORCEMENTS" is "UNIT" where AT value (attack force) is one (1) and DF value (defense force) is two (2). The game turn control program GTP deals with AT value and DF value of the opponent's player as the total value of both "UNIT" of "α" and "β" at the time of computing and judging the process for seizing the damage when "UNIT" of "REINFORCEMENTS" is disposed.

On this occasion, the game turn control program GTP computes for firstly distributing DF value "2" concerning the card "β" last disposed on the hex 29 by the opponent's player (the enemy's troop) at the time of computing the remaining DF value of the card of the opponent's player (the enemy's troop), that is, computing the damage with the calculation equation for dealing with the seizing damage. Since AT value (attack force) of "A" of one's own player is "4", "2" of "4" of the attack force is distributed to "2" of DF value of "β", and "2" of remaining AT value of "A" is distributed to "2" of "3" of DF value of "α" in this case. As the result, DF value of "β" becomes zero ("0"), DF value of "α" becomes "1", and AT value of "A" becomes zero ("0") Then, "UNIT" of "β" is dealt with as "DESTRUCTION", but the judgment concerning "α" is not "DESTRUCTION" since DF value of "α" is "1".

In a similar way, a process for distributing "3" which is total AT value of all "UNIT" of the opponent's player (enemy's troop) to "A" of one's own player is executed at the time of computing the remaining DF value of one's own player (attack side), that is, at the time of computing damage. By doing so, DF value "4" of "A" exceeds AT value "3" of the opponent's player, and DF value "1" remains. So, the judgment concerning "A" at this time is not "DESTRUCTION" also.

As the result, the game turn control program GTP judges such state that "α" and "A" of both "UNIT" of one's own player and the opponent's player remain on the same hex 29 of the opponent's player. In this case, "UNIT" of "A" on "INVASION" side, that is, of "ONE'S OWN PLAYER" is dealt with as "DESTRUCTION", as already mentioned. The display of both cards, "A" of one's own player and "β" of the opponent's player which have been displayed on the hex 29 is stopped by dealing with both cards as "DESTRUCTION", and the display on the monitor 3 is controlled, moving to the respective wastepile rests 31, 31.

The player finishes the behavior phase of Step S2 as shown in FIG. 5 after disposing or summoning the cards in hand displayed on one's own hand display area 34 on the area 27, moving these cards in one's own area, or moving the card in the area 27 to the area 27 on the opponent's side as transfer action, within the bounds of the action point (AP). After the finish of one's own behavior phase is instructed to the CPU 11 by properly operating the input device 4 by the player, the CPU 11 enters into Step S3 of the game turn control program GTP so as to transfer the game from the behavior phase to supplementary phase.

In this supplementary phase, the game turn control program GTP basically executes a process for retrieving damage of "UNIT" received in the behavior phase, a process for supplementing the hand according to the number of the controlling hexes 29, a process for obtaining victory point and a process for adjusting the number of the hand.

That is, the damage concerning "UNIT" which has received damage in "BATTLE" of the behavior phase is retrieved up to predetermined AT value and DF value determined in "UNIT". This retrieving process is executed on "UNIT" disposed on the area 27, but is not executed on "UNIT" which is dealt with as "DESTRUCTION" in the behavior phase and is dealt with as movement to the wastepile rest 31. By this retrieving process, all "UNIT" of one's own player and the opponent's player disposed in the area 27 is dealt with as retrieval up to the predetermined AT value and DF value which are displayed on the "UNIT".

On this occasion, proper parameters, such as AT value and DF value of each card disposed in the area 27 during a turn are stored in a proper memory, and are properly rewritten according to assistance given and damage received at the time of "REINFORCEMENTS" or "BATTLE" so as to always keep up-to-date value. Therefore, the card of which the proper parameter in the memory is changed in the behavior phase is returned to the value of the proper parameter which the card originally has by such retrieval process.

And, the game turn control program GTP executes a process of adding two (2) points of victory points for one hex, where "UNIT" of one's own player, that is, "UNIT" of one's own troop is disposed, on the place 25 of the opponent's player, that is, on the area 27 of the enemy's troop. The victory point VP of each player is stored in the proper area in the RAM 13, and is updated whenever the event through which the victory point VP is changed occurs.

Furthermore, the game turn control program GTP executes a hand supplementary process of moving one card from the talon rest 30 for one hex, where "UNIT" of one's own troop is disposed in the area 27 of the player (one's own troop) who executes a turn, and displaying on the hand display area 34. When the number of the hand displayed on the hand display area 34 exceeds limited number (5 sheets, for example) as the result, the player is invited on the monitor 3 to throw optional hand such that the number of the hand displayed on the hand display area 34 is within the limited number. Receiving this invitation, the player instructs the card to be thrown from the hand to the CPU 11 through the input device 4, and the CPU 11 executes a process of moving the card instructed by the player from the hand display area 34 on the monitor 3 to the wastepile rest 31 on the basis of the game turn control program GTP.

When the supplementary phase of Step S3 of FIG. 5 finishes, the game turn control program GTP enters into judgment phase of Step S4. In the judgment phase, the player in one's own turn can declare the following by operating the input device 4. That is, the player can declare a) victory declaration b) defeat declaration, or c) turn finish declaration.

The player in one's own turn can declare the victory declaration in such a state that any of the conditions for victory declaration shown below is met.

a) The victory point obtained by one's own is ten (10) points or more.

b) The victory point obtained by one's own is bigger than one obtained by the opponent one (1) point or more.

In any case, the player can declare the victory declaration by operating the input device 4, referring to the victory point VP of one's own player and the opponent's player, displayed on the monitor 3. When a signal corresponding to the victory declaration is input through the input device 4, the game turn control program GTP disposes a flag showing the victory declaration is input by the player in a proper address of the RAM 13 so as to execute the victory judgment as to whether or not the predetermined victory condition is satisfied in the judgment phase S4 of the next turn of the opponent's player.

This victory judgment is judged by the following victory conditions. That is, a) one's own player wins when the one's own player declares victory declaration and the above-mentioned victory declaration condition is not broken till the judgment phase in the next turn of the opponent's side via the behavior phase and the supplementary phase, or b) the opponent's player wins when the one's own player declares victory declaration and the above-mentioned victory declaration condition is broken till the judgment phase in the next turn of the opponent's side via the behavior phase and the supplementary phase.

The game turn control program GTP always watches the change of the victory point VP of the players during a pitched battle from the victory declaration to the judgment phase in the turn on the opponent's side. When the judgment phase of the opponent's player finishes, the game turn control program GTP compares both victory points with each other so as to judge who is a winner. The result, which of one's own player and the opponent's player wins is displayed on the monitor 3. On this occasion, to "BREAK" the victory declaration by the opponent's player is that a) the victory point VP obtained by the opponent's player is made nine (9) or less or b) the victory point VP owned by one's own is made more than one owned by the opponent's player. It is necessary for the player against whom the victory declaration is declared by the opponent's player to execute the behavior phase of his own so as to satisfy the condition for "BREAK" above-mentioned in the next last his own turn after the victory declaration.

Defeat declaration is a declaration which can be selected when the player during one's own turn wants to save the damages on one's own side after taking into consideration the difference of the victory point VP obtained by one's own player and the opponent's player or the fighting power therebetween. Similar to the victory declaration, the game turn control program GTP executes the defeat process by "DEFEAT DECLARATION" by properly operating the input device 4 so as to output a predetermined signal to the CPU 11.

In this case, the game turn control program GTP executes a process for judging that the opponent's player is a winner in the turn where "DEFEAT DECLARATION" is declared and immediately finishes the card game in the course of play at present. On this occasion, "DEFEAT DECLARATION" can be declared only in the judgment phase in the turn of one's own, and even if the defeat declaration is input through the input device 4 in the other phases, this is dealt with as an input error so as to display this fact on the monitor.

Turn finish declaration is for declaring "FINISH OF TURN" of one's own to the opponent's player, and the game turn control program GTP judges the finish of the turn of the player by properly operating the input device 4 by the player so as to output a predetermined signal to the CPU 11. Thereafter, the game turn control program GTP returns to Step S2 so as to enter into the control of the behavior phase concerning the opponent's player. After this "TURN FINISH DECLARATION" is declared, the effect or the power shown on the text space 41 of various kinds of the cards, showing "TILL TURN FINISH" thereon is invalidated. So, it is necessary to always declare the turn finish declaration every time till the finish of the game so long as any of the victory declaration and the defeat declaration is not declared.

When the turn finish declaration is declared, the turn of the game is transferred to the opponent's player. The game turn control program GTP displays who is the player to be played next on the monitor 3 and controls such that the game proceeds without confusion. In this way, the opponent's player executes one's own turn on the basis of the game turn control program GTP at this time. The game proceeds in this way. The point of the present card game is how many victory points VP one's own player obtains in comparison with the opponent's player since the victory is judged according to the number of the victory point VP obtained by the respective players by the game turn control program GTP.

The addition of the victory point VP is executed in the turn of each player by the game turn control program GTP in principle. The events for obtaining the victory point VP during a game are as follows.

a) two (2) VP is obtained in case of batting last in the game, b) one (1) VP is obtained when the opponent's player exchanges the hand prior to the game, c) when "UNIT", "REINFORCEMENTS" or "OPTION" of the enemy's troop is left from the area 27 and moved to the wastepile rest 31 at the result of the effect of the other cards or battle, the VP shown on the card moved is obtained, d) two (2) VP is obtained for one hex in the area 27 of the enemy's troop which is controlled by one's own troop at the time of the supplementary phase of one's own turn, or e) five (5) VP is obtained in case where no card is left on the talon rest of the opponent's player and the cards are renewed. When the card game program CGP judges that the above-mentioned event for obtaining the victory point VP occurs in a game, the value adding the victory point VP of each player which is stored in the RAM 13 is updated so as to store always up-to-date victory point VP.

When the game finishes by the victory declaration or the defeat declaration, the card game program CGP enters in "PROCESS FOR TRANSFERRING WAR TROPHY". When such arrangement that the process for transferring war trophy is not executed is set through the input device 4 prior to the start of the game, the process is skipped.

The process for transferring war trophy is executed by transferring by the defeated the card having the value the same (shown on each card) as the difference of the victory point VP obtained by both players to the winner after the game finish. The card to be transferred is selected by selecting one of the cards owned by one's own by the defeated of the game. Therefore, the player who lost the game operates the input device 4 so as to display the cards owned by one's own which are stored as owned card data of the RAM 19 on the monitor 3, and selects and determines the card to be given to the opponent's player. The card determined to give to the opponent's player is deleted from the owned card data concerning the player in the RAM 19 on the basis of the card game program CGP by the instruction by the player through the input device 4 so as to write in the area for storing the owned card data in the RAM 19 of a portable game machine of the opponent's player through a communication line or so as to write in the area for storing owned card data of a virtual player in the RAM 19 in the case where the opponent's player is a player falsely played by the CPU 11 on the basis of the card game program CGP.

In the case where "VICTORY DECLARATION" of the opponent is broken, the victory point obtained by both players may be the same. In this case, the card game program CGP gives the winner a right of receiving the card having the value of one (1) VP from the defeated, and displays the card having one (1) VP of the value to the defeated player on the monitor 3 so as to select for transferring to the opponent's player, and invites the defeated player to select the card to be transferred to the opponent's player. The process after the card is selected is similar to the above-mentioned case.

When the game finishes by the defeat declaration, it is necessary to transfer the card having one (1) VP of the value even if the victory point VP obtained at the time of game finish is more than one of the opponent's player. The card game program CGP displays the card having one (1) VP of the value to the player who declared the defeat declaration and lost the game on the monitor 3 so as to select for transferring to the opponent's player, and invites this player to select the card to be transferred to the opponent's player. The process after the card is selected is similar to the above-mentioned case. When the victory point VP obtained by one's own is less than one of the opponent's player, it is necessary to transfer the card having the value of the same number as the difference of the victory point VP obtained by both. The card game program CGP executes a process similar to the finish of the game by the victory declaration.

In the above-mentioned embodiment, the CPU is a game control device, and the combination between the CPU 11 and a specific software is various kinds of means of a game control device, but at least a part of these means may be replaced by a logical circuit.

Besides, the present invention is not always a game system for home use, but may be a game system having various kinds of scales.

The present invention is explained on the basis of the embodiment heretofore. The embodiment which is described in the present specification is illustrative and not limiting. The scope of the invention is designated by the accompanying claims and is not restricted by the descriptions of the specific embodiment. Accordingly, all the transformations and changes belonging to the claims are included in the scope of the present invention.

The invention claimed is:

1. A computer program product, stored in a computer readable medium, for controlling a card game between two players, a player and its opponent, the computer program product being operable to cause data processing apparatus to:

for each player, provide on a screen,
  a pile region where cards for use during the card game are disposed;
  a wastepile region where destroyed cards and used cards which appear during a proceeding of the card game are disposed;
  a hand display region where cards for use during a hand of the card game are displayed;
  a battle place region comprising the same number of hexes, each region having the same configuration for hexes on which cards in play during the card game are respectively disposed;

for each player, determine a set of cards for use by the player during the card game, and provide the set of cards as a talon on the pile region of the screen;

set a hand of the card game for the player by drawing a predetermined number of cards from the talon and displaying the drawn cards on the hand display region of the screen;

in response to an instruction by the player during a turn of the card game, selectively move a card which is displayed in the hand display region for the player to a hex of the battle place region for the player; and in response to an instruction by the player during a turn of the card game, selectively move a card which is disposed on a hex of the battle place region for the player to a hex of the battle place region for its opponent;

execute a battle-related process during a turn of the card game when a first card and a second card are disposed on a single hex to signal an initiation of a battle, the first card being associated with a first of the two players and the second card being associated with the second of the two players, the first card having a first defense force value and a first attack force value, the second card having a second defense force value and a second attack force value, the executed battle-related process to:

calculate a change to the first defense force value based at least in part on the second attack force value;

calculate a change to the second defense force value based at least in part on the first attack force value;

identify the first card or the second card as being destroyed during the battle based on the calculations; and move the identified card to a wastepile region of the screen;

at a conclusion of each turn during the card game, compute for each player each and every turn, a victory point value based on a number of hexes, provided in the battle place region for its opponent, in which a card of the player is disposed and display the victory point value on the screen;

enable a first of the two players each and every turn to initiate a conclusion of the card game by declaring victory on the basis of said victory point value; and following the victory declaration by the first of the two players, enable only a last turn of the card game to be executed by a second of the two players, the last one turn comprising an initiation of a battle by the second of the two players;

execute a battle-related process during the last turn;

compute a victory point value for each player at a conclusion of the last turn; and identify one of the two players as victorious based on a determination as to whether or not a predetermined victory condition is satisfied.

2. The computer program product according to claim 1 being operable to cause the data processing apparatus to:

for each player, determine a set of cards for use by the player during the card game by selecting the set of cards from a pool of available cards in response to an instruction by the player.

3. The computer program product according to claim 1 being operable to cause the data processing apparatus to add a predetermined number of victory points to the victory point value for a player as the player disposes a card on a hex of the battle place region for its opponent.

4. The computer program product according to claim 3, wherein the set of cards comprises a unit card on which parameters of attack force and defense force are set, the program being operable to cause the data processing apparatus to add a predetermined number of victory points to the victory point value for the player as the player disposes a unit card on a hex of the battle place region for its opponent.

5. The computer program product according to claim 1 being further operable to cause the data processing apparatus to maintain an action point value for each player and to permit a player to selectively dispose a card on a hex or remove a card from a hex provided the player has a sufficient action point value.

6. The computer program product according to claim 1, wherein the set of cards comprises a territory card and a supported card, the territory card having a parameter concerning quantity of support necessary at the time when another card functions as a supported card, and the supported card having a parameter concerning necessary support number by the territory card, and the program being further operable to cause the data processing apparatus to compute support/hold quantity for watching a supporting state in a battle place region by said territory card, compute and judge excess or deficiency of necessary support number of said supported card, and destroy said supported card when said supporting state of the battle place region is changed in such a state that said support number necessary for said supported card disposed on the battle place region is not satisfied.

7. The computer program product according to claim 1, wherein the set of cards comprises a unit card on which parameters of attack force and defense force are set, the program being further operable to cause the data processing apparatus to supplement a hand of the card game for the player by taking a card from the talon according to a number of unit cards disposed on respective hexes of one's own area during one's own turn and adding to one's own hand.

8. A card game machine for controlling a card game for two players, a player and its opponent, the card game machine comprising:

for each player, means for providing on a screen, a pile region where cards for use during the card game are disposed;

a wastepile region where destroyed cards and used cards which appear during a proceeding of the card game are disposed;

a hand display region where cards for use during a hand of the card game are displayed;

a battle place region comprising the same number of hexes, each region having the same configuration for hexes on which cards in play during the card game are respectively disposed;

for each player, means for determining a set of cards for use by the player during the card game, and means for providing the set of cards as a talon on the pile region of the screen;

means for setting a hand of the card game for the player by drawing a determined number of cards from the talon and displaying the drawn cards on the hand display region of the screen;

in response to an instruction by the player during a turn of the card game, means for selectively moving a card which is displayed in the hand display region of the player to a hex of the battle place region for the player; and in response to an instruction by the player during a turn of the card game, means for selectively moving a card which is disposed on a hex of the baffle place region for the player to a hex of the battle place region for its opponent;

means for executing a battle-related process during a turn of the card game when a first card and a second card are disposed on a single hex to signal an initiation of a battle, the first card being associated with a first of the two players and the second card being associated with the second of the two players, the first card having a first defense force value and a first attack force value, the second card having a second defense force value and a second attack force value, the means for executing the battle-related process comprising:

means for calculating a change to the first defense force value based at least in part on the second attack force value;

means for calculating a change to the second defense force value based at least in part on the first attack force value;

means for identifying the first card or the second card as being destroyed during the battle based on the calculations; and means for moving the identified card to a wastepile region of the screen;

at a conclusion of each turn during the card game, means for computing for each player each and every turn, a victory point value based on a number of hexes, provided in the battle place region for its opponent, in which a card of the player is disposed and displaying the victory point value on the screen;

means for enabling a first of the two players each and even turn to initiate a conclusion of the card game by declaring victory on the basis of said victory point value; and following the victory declaration by the first of the two players, means for enabling only a last turn of the card game to be executed by a second of the two players, the last one turn comprising an initiation of a battle by the second of the two players;

means for executing a battle-related process during the last turn;

means for computing a victory point value for each player at a conclusion of the last turn, and means for identifying one of the two players as victorious based on a determination as to whether or not a predetermined victory condition is satisfied.

* * * * *

UNITED STATES PATENT AND TRADEMARK OFFICE
CERTIFICATE OF CORRECTION

PATENT NO. : 7,371,165 B2  Page 1 of 1
APPLICATION NO. : 10/315375
DATED : May 13, 2008
INVENTOR(S) : Hirotaka Reizei and Kazunobu Uchida It is certified that error appears in the above-identified patent and that said Letters Patent is hereby corrected as shown below:

In claim 8, column 23, line 3, delete "baffle" and insert --battle--, therefor

In claim 8, column 24, line 7, delete "even" and insert --every--, therefor

Signed and Sealed this

Twelfth Day of August, 2008

JON W. DUDAS
*Director of the United States Patent and Trademark Office*